United States Patent
Seol et al.

(10) Patent No.: US 12,142,813 B2
(45) Date of Patent: Nov. 12, 2024

(54) ELECTRONIC DEVICE COMPRISING AN ANTENNA

(71) Applicant: Samsung Electronics Co., Ltd., Suwon-si (KR)

(72) Inventors: Kyungmoon Seol, Suwon-si (KR); Kyunggu Kim, Suwon-si (KR); Dongyeon Kim, Suwon-si (KR); Sumin Yun, Suwon-si (KR); Jaebong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 18/145,495

(22) Filed: Dec. 22, 2022

(65) Prior Publication Data

US 2023/0118019 A1 Apr. 20, 2023

Related U.S. Application Data

(63) Continuation of application No. PCT/KR2021/016569, filed on Nov. 12, 2021.

(30) Foreign Application Priority Data

Nov. 13, 2020 (KR) .......................... 10-2020-0152084
Dec. 23, 2020 (KR) .......................... 10-2020-0182271

(51) Int. Cl.
*H01Q 1/24* (2006.01)
*G01S 13/82* (2006.01)
(Continued)

(52) U.S. Cl.
CPC .............. *H01Q 1/22* (2013.01); *G01S 13/82* (2013.01); *G06F 1/1652* (2013.01);
(Continued)

(58) Field of Classification Search
CPC .. H01Q 1/24; H01Q 1/22; H01Q 5/25; H01Q 21/00; H01Q 21/28
See application file for complete search history.

(56) References Cited

U.S. PATENT DOCUMENTS 9,964,995 B1 5/2018 Morrison et al.
10,547,718 B2 * 1/2020 Lee .................. G06F 1/1652
(Continued)

FOREIGN PATENT DOCUMENTS

CN 108594934 A 9/2018
KR 10-2017-0006089 A 1/2017
(Continued)

OTHER PUBLICATIONS

Extended European Search Report dated Feb. 26, 2024, issued in European Patent Application No. 21892374.6.

*Primary Examiner* — Hoang V Nguyen
(74) *Attorney, Agent, or Firm* — Jefferson IP Law, LLP

(57) ABSTRACT

An electronic device is provided. The electronic device includes a housing including a first housing and a second housing, a flexible display, at least one contact structure, a first processor, and a first ultrawide band (UWB) antenna, a second UWB antenna, a third UWB antenna, and a fourth UWB antenna, and, in a first state, the first processor may transmit and/or receive a signal of a designated frequency band, based on at least two of the first UWB antenna and the second UWB antenna, and the third UWB antenna, and, in a second state, the first processor may transmit and/or receive a signal of a designated frequency band, based on at least two of the first UWB antenna and the second UWB antenna, and the fourth UWB antenna which is disposed in the flexible display.

20 Claims, 21 Drawing Sheets

(51) Int. Cl.
  *G06F 1/16*    (2006.01)
  *H01Q 1/22*    (2006.01)
  *H01Q 5/25*    (2015.01)
  *H01Q 21/00*   (2006.01)

(52) U.S. Cl.
  CPC ............ *G06F 1/1698* (2013.01); *H01Q 5/25* (2015.01); *H01Q 21/00* (2013.01)

(56) References Cited

U.S. PATENT DOCUMENTS

| | | |
|---|---|---|
| 11,252,826 B2 | 2/2022 | Park et al. |
| 11,470,729 B2 | 10/2022 | Kim et al. |
| 2019/0170847 A1 | 6/2019 | Jamin et al. |
| 2019/0261519 A1 | 8/2019 | Park et al. |
| 2019/0317550 A1 | 10/2019 | Kim et al. |
| 2020/0014099 A1 | 1/2020 | Ghabra et al. |
| 2020/0021011 A1 | 1/2020 | Cooper et al. |
| 2020/0259258 A1 | 8/2020 | Amiri et al. |
| 2020/0344336 A1 | 10/2020 | Li et al. |
| 2021/0020076 A1* | 1/2021 | Li .................. G06F 1/1652 |
| 2022/0029272 A1 | 1/2022 | Hong et al. |

FOREIGN PATENT DOCUMENTS

| | | | |
|---|---|---|---|
| KR | 10-2019-0101184 A | 8/2019 | |
| KR | 10-2019-0115888 A | 10/2019 | |
| KR | 10-2019-0129297 A | 11/2019 | |
| KR | 10-2019-0143029 A | 12/2019 | |
| KR | 10-2020-0117575 A | 10/2020 | |
| RU | 2 729 061 C1 | 8/2020 | |
| WO | WO-2020171580 A1 * | 8/2020 | ............. H01Q 1/243 |

* cited by examiner

ELECTRONIC DEVICE COMPRISING AN ANTENNA

TECHNICAL FIELD

The disclosure relates to an electronic device including an ultra-wide band (UWB) antenna.

BACKGROUND ART

A rollable electronic device is an example of an electronic device. A portable electronic device may include a display to have a large size in order to provide a wide screen. However, since a size of an electronic device inevitably increases as a display becomes larger, there may be a limit to the size of the display. The rollable electronic device is a next-generation electronic device to overcome such a limit and may have a part of a flexible display selectively entered into a housing thereof.

With the development of wireless communication technology, connectivity techniques for providing various functions by connecting an electronic device to an external device are appearing. For example, an electronic device may detect its position or a position of an external device (for example, an Internet of things (IoT) device), based on wireless communication with the external device. The electronic device may control various functions of the external device based on the detected position, or may provide various position-based services to a user who owns the electronic device.

Ultra-wide band (UWB) communication technology may be applied to precisely detect the position of the electronic device and/or the position of the external electronic device. The electronic device may include a plurality of UWB antennas for performing positioning in order to apply UWB communication technology.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

A rollable electronic device may be in a state in which a part of a display is entered into a housing (hereinafter, referred to as a first state), and a state in which a part of the display is extended from the housing (hereinafter, referred to as a second state). The rollable electronic device may include a part of the flexible display therein in the first state. Due to the flexible display positioned in the electronic device in the first state, the rollable electronic device may have a problem that a space in the housing is not sufficient to dispose antennas for providing various functions according to development of wireless communication technology. For example, in the case of the rollable electronic device, the space in the housing for disposing UWB antennas may not be sufficient and it may be difficult to dispose a plurality of UWB antennas.

Aspects of the disclosure are to address at least the above-mentioned problems and/or disadvantages and to provide at least the advantages described below. Accordingly, an aspect of the disclosure is to provide an electronic device which has a plurality of UWB antennas disposed in an inner space of a housing and a flexible display.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a housing including a first housing and a second housing, a flexible display, at least one contact structure, a first processor disposed in the first housing, and a first UWB antenna, a second UWB antenna, a third UWB antenna, and a fourth UWB antenna, and, in a first state in which the first housing and the second housing come into contact with each other through the at least one contact structure, at least part of the flexible display may be entered into at least one of the first housing and the second housing, and, in a second state in which the first housing and the second housing are spaced apart from each other more than a designated distance, at least part of the flexible display may be extended to be viewed from an outside of the electronic device, and, in the first state, the first processor may be configured to transmit and/or receive a signal of a designated frequency band, based on at least two of the first UWB antenna and the second UWB antenna which are disposed in the first housing, and the third UWB antenna which is disposed in the second housing and is electrically connected through the at least one contact structure, and, in the second state, the first processor may be configured to transmit and/or receive a signal of a designated frequency band, based on at least two of the first UWB antenna and the second UWB antenna, and the fourth UWB antenna which is disposed in the flexible display.

In accordance with another aspect of the disclosure, an electronic device is provided. The electronic device includes a housing including a first housing and a second housing, a flexible display, at least one contact structure, at least one processor disposed in the first housing, and a first UWB antenna, a second UWB antenna, and a third UWB antenna, and, in a first state in which the first housing and the second housing come into contact with each other through the at least one contact structure, the flexible display may be entered into at least one of the first housing and the second housing, and, in a second state in which the first housing and the second housing are spaced apart from each other more than a designated distance, the flexible display may be extended to be viewed from an outside of the electronic device, and, in the first state, the at least one processor may be configured to transmit and/or receive a signal of a designated frequency band, based on at least two of the first UWB antenna and the second UWB antenna which are disposed in the first housing along a first axis, and the third UWB antenna which is disposed in the second housing along a second axis which is perpendicular to the first axis, and is electrically connected with the at least one processor through the at least one contact structure.

Advantageous Effects of Invention

According to various embodiments disclosed in the disclosure, a plurality of UWB antennas may be distributed and arranged within a housing and a flexible display of an electronic device.

In addition, according to various embodiments, a position-based service can be provided to a user in a first state and a second state by using UWB antennas disposed within a housing and a flexible display.

In addition, various effects that can be directly or indirectly understood through the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

BEST MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
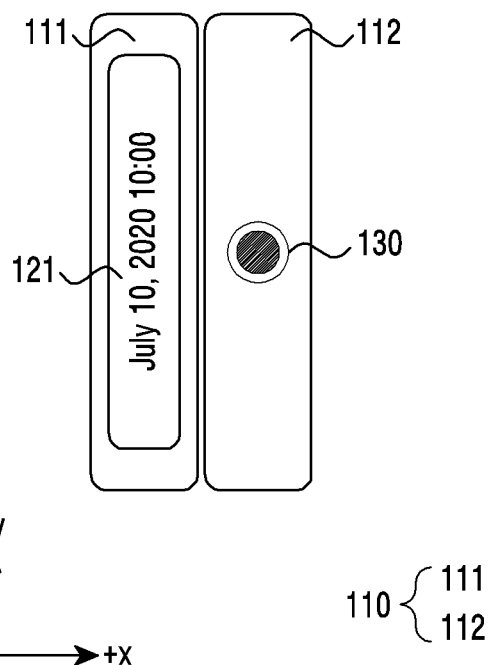
FIG. 1A is a front view of a first state of an electronic device according to an embodiment of the disclosure.

FIG. 1A is a front view of a first state of an electronic device according to an embodiment of the disclosure.

Figure 1B:
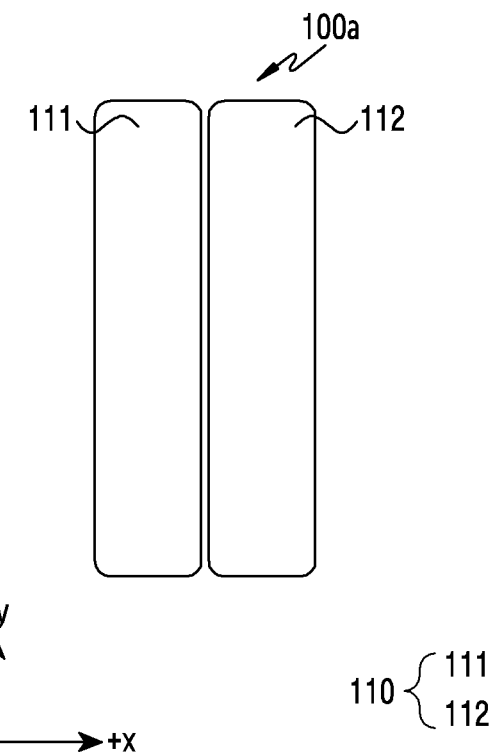
FIG. 1B is a rear view of the first state of the electronic device according to an embodiment of the disclosure.

FIG. 1B is a rear view of the first state of the electronic device according to an embodiment of the disclosure.

Figure 1C:
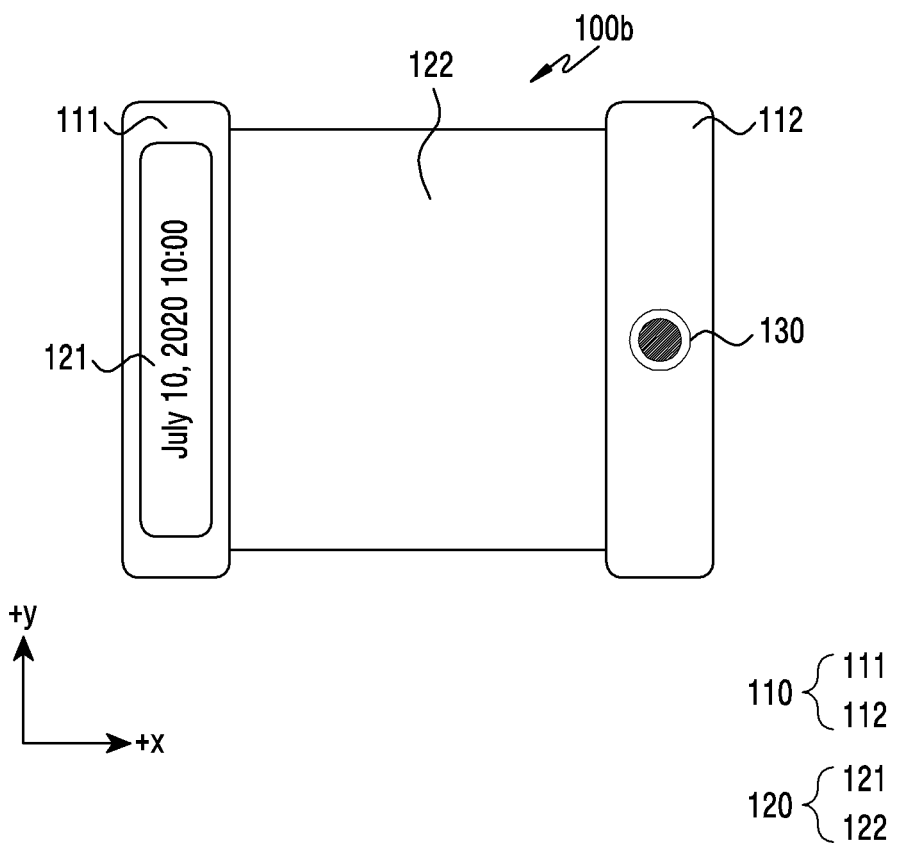
FIG. 1C is a front view of a second state of the electronic device according to an embodiment of the disclosure.

FIG. 1C is a front view of a second state of the electronic device according to an embodiment of the disclosure.

Referring to FIGS. 1A, 1B, and 1C, the electronic device 100 in an embodiment may include a housing 110, a display 120, and/or a button 130. In an embodiment, the display 120 may include a sub display 121 and/or a main flexible display 122.

Referring to FIG. 1C, the electronic device 100 according to an embodiment may include the sub display 121 and/or the main flexible display 122. In an embodiment, the sub display 121 may be implemented by a flexible display according to a shape or a structure of the housing 110 or the electronic device 100.

According to an embodiment, a surface on which the sub display 121 is disposed may be defined as a front surface of the electronic device 100, and a surface facing in the opposite direction of the front surface may be defined as a rear surface of the electronic device 100. A surface surrounding a space between the front surface and the rear surface may be defined as a side surface of the electronic device 100. In another embodiment, the surface on which the sub display 121 is disposed may be defined as the rear surface of the electronic device 100, and the surface facing in the opposite direction of the rear surface may be defined as the front surface of the electronic device 100. In a certain embodiment, the electronic device 100 may not include the sub display 121. However, in the following descriptions, it is assumed that the sub display 121 is disposed on the front surface of the electronic device 100 for convenience of explanation.

Referring to FIGS. 1A, 1B, and 1C, the housing 110 according to an embodiment may form some areas of the front surface of the electronic device 100, the rear surface, and the side surface. According to another embodiment, the housing 110 may form some areas of the side surface of the electronic device 100 and the rear surface. In an embodiment, the housing 110 may include a conductive material (for example, metal).

According to an embodiment, the housing 110 may include a first housing 111 and a second housing 112.

According to an embodiment, the electronic device 100 may have a first state 100a and a second state 100b.

In an embodiment, the first state 100a and the second state 100b of the electronic device 100 may be determined according to relative positions of the first housing 111 and the second housing 112. For example, referring to FIG. 1B, the first state 100a may refer to a state of the electronic device 100 in which the first housing 111 and the second housing 112 are adjacent to each other. In another example, the first state may refer to a state in which the main flexible display 122 is not visually seen from the outside. In still another example, referring to FIG. 1C, the second state 100b may refer to a state in which the first housing 111 moves in a −x direction or the second housing 112 moves in a +x direction in the first state 100a, and the first housing 111 and the second housing 112 are spaced apart from each other more than a designated distance. In yet another example, the second state may refer to a state in which the main flexible display 122 is visually seen from the outside.

In an embodiment, the electronic device 100 may change between the first state 100a and the second state 100b by user's operation or mechanical operation. For example, the electronic device 100 may change between the first state 100a and the second state 100b by user's operation on the button 130 described below.

According to an embodiment, the main flexible display 122 may be extended to the outside of the housing 110 or may be entered thereinto according to a state of the electronic device 100. For example, the electronic device 100 may switch from the first state 100a to the second state 100b such that the first housing 111 moves in the −x direction or the second housing 112 moves in the +x direction, and the main flexible display 122 is extended to the outside of the housing 110. In another example, the electronic device 100 may switch from the second state 100b to the first state 100a such that the first housing 111 moves in the +x direction or the second housing 112 moves in the −x direction, and the main flexible display 122 is entered into the housing 110.

In various embodiments, the main flexible display 122 being extended (exposed) may mean that an extended part of the display is viewed from the outside of the electronic device 100, and the main flexible display 122 being entered may mean that an entered part of the main flexible display 122 is not viewed from the outside of the electronic device 100.

According to an embodiment, the display 120 may emit light from pixels in order to deliver information to the user, and light emitted from the pixels may be delivered to the outside of the electronic device 100 through the display 120. In an embodiment, the display 120 may include a protection layer such as tempered glass.

According to an embodiment, the housing 110 may include the button 130 disposed on a certain portion thereof. For example, the second housing 112 may include the button 130 disposed on a portion forming the front surface of the electronic device 100. In another example, the second housing 112 may include the button 130 disposed on a certain portion forming the side surface of the electronic device 100. In still another example, the button 130 may be omitted.

According to an embodiment, the electronic device 100 may switch from the first state 100a to the second state 100b by a user input (for example, an input of pressing or touching the button 130). For example, when the electronic device 100 is in the first state 100a, a processor of the electronic device 100 may recognize the user input and may switch the electronic device 100 to the second state 100b.

In various embodiments of the disclosure, the shape of the electronic device illustrated in FIGS. 1A, 1B, and 1C is to explain an example of the electronic device that can have a display region extended, and the shape of the electronic device is not limited to those illustrated in FIGS. 1A, 1B, and 1C.

Figure 2:
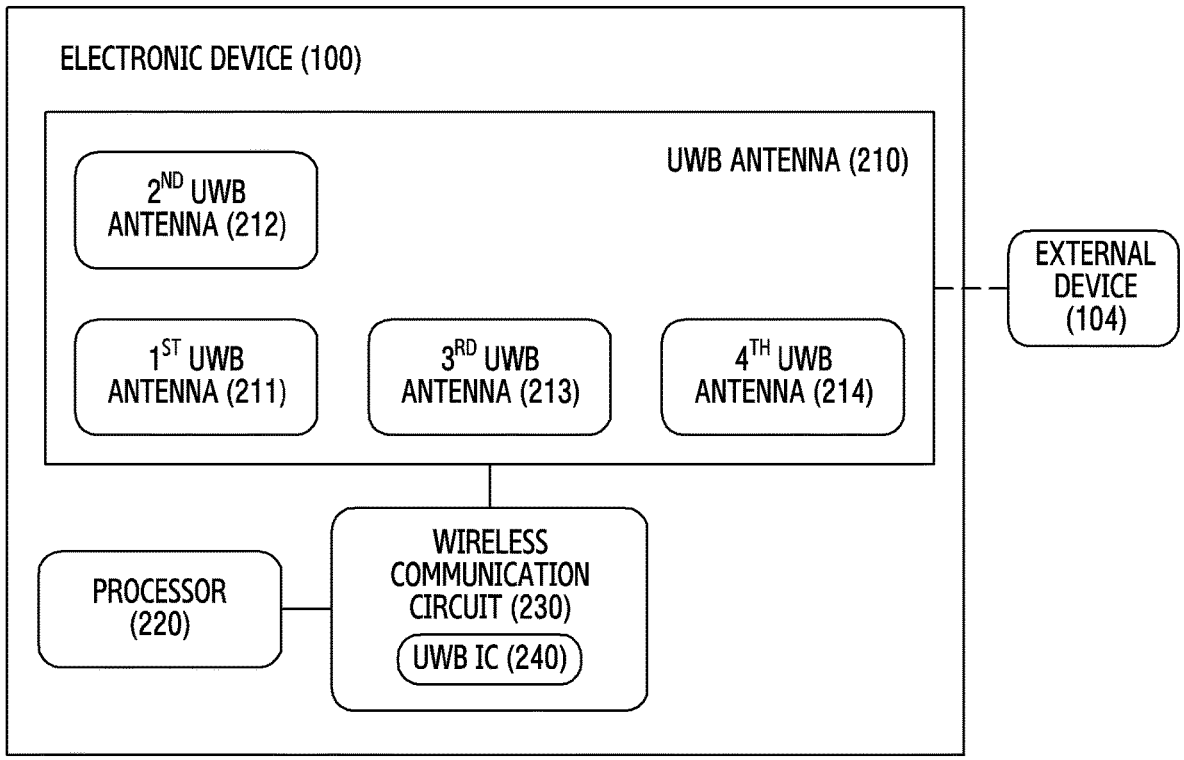
FIG. 2 is a block diagram of an electronic device according to an embodiment according to an embodiment of the disclosure.

FIG. 2 is a block diagram of an electronic device according to an embodiment of the disclosure.

Referring to FIG. 2, the electronic device 100 according to an embodiment may include an ultra-wide band (UWB) antenna 210, a processor 220, and/or a wireless communication circuit 230. In an embodiment, the wireless communication circuit 230 may include a UWB integrated circuitry (IC) 240.

According to an embodiment, the UWB antenna 210 may include a first UWB antenna 211, a second UWB antenna 212, a third UWB antenna 213, and/or a fourth UWB antenna 214. In an embodiment, the UWB antenna 210 may operates as an antenna for transmitting or receiving a radio frequency (RF) signal of a designated band. The RF signal of the designated band may include a UWB signal which is transmitted in a UWB frequency band (for example, a frequency band having a central frequency of 6 GHz to 8 GHz). The UWB signal may be based on an impulse radio method. The UWB signal may have a designated bandwidth, for example, a bandwidth of 499 MHz or a bandwidth of 500 MHz or higher. However, this should not be considered as limiting.

According to an embodiment, the UWB antenna 210 may operate as an antenna for measuring a distance between the electronic device 100 and an external device 104.

According to an embodiment, the UWB antenna 210 may operate as an antenna for measuring an angle of arrival (AOA) of an RF signal received from the external device 104.

In various embodiments, the UWB antenna 210 may include antenna structures of various types. For example, the UWB antenna 210 may include a patch antenna, a dipole antenna, a monopole antenna, a slot antenna, a loop antenna, an inverted-F antenna, a planar inverted-F antenna, and/or an antenna structure of a combination of two or more of these antennas.

In an embodiment, the processor 220 may execute an application related to UWB communication, and may control the UWB IC 240 to perform positioning based on an RF signal received from the external device 104, based on the UWB antenna 210.

According to an embodiment, the wireless communication circuit 230 may feed the UWB antenna 210 under control of the at least one processor 220, and may transmit and/or receive an RF signal to and/or from the external device 104.

In an embodiment, the processor 220 may identify a round trip time (RTT) and an angle of arrival (AOA) of the RF signal, based on the RF signal received from the external device 104. The processor 220 may determine a position of the external device 104, based on the identified RTT and AOA.

In various embodiments, the external device 104 may include, for example, various devices capable of wirelessly communicating. For example, the external device 104 may include a laptop computer, a tablet computer, a mobile phone, a wearable device such as an electronic watch, a headphone, and/or earbuds, or a car capable of wirelessly communicating, but is not limited to the above-described example. Hereinafter, a method for the processor 220 to determine a position of the external device 104 will be described.

According to an embodiment, the processor 220 may control the UWB IC 240 to measure a distance between the electronic device 100 and the external device 104, based on an RF signal transmitted and received to and from the external device 104. The processor 220 may transmit and/or receive a message including time stamp information to and/or from the external device 104, by using the UWB antenna 210. For example, the processor 220 may transmit at least one distance measurement request message including information regarding a transmission time to the external device 104 by using the UWB antenna 210. The external device 104 may transmit at least one distance measurement response message to the electronic device 100 in response to the at least one distance measurement request message being received. The processor 220 may receive the at least one distance measurement response message by using the UWB antenna 210. The at least one distance measurement request message and the at least one distance measurement response message may include time information regarding their respective transmitting and receiving times. The processor 220 may determine a time (round trip time (RTT)) required to receive the at least one distance measurement response message after transmitting the at least one distance measurement request message. The processor 220 may determine a reply time required for the external device 104 to transmit the at least one distance measurement response message after receiving the at least one distance measurement request message. The processor 220 may determine a time of flight (TOF) required for radio waves transmitted from the electronic device 100 to arrive at the external device 104, based on the RTT and the reply time (for example, (RTT-reply time)÷2). The processor 220 may measure the distance between the electronic device 100 and the external device 104 based on the TOF (for example, TOF×velocity of light).

In an embodiment, the processor 220 may control the UWB IC 240 to measure the AOA of the RF signal received from the external device 104 by using the UWB antenna 210. For example, the processor 220 may determine a phase difference between a first RF signal received by using the first UWB antenna 211 and a second RF signal received by using the second UWB antenna 212. The processor 220 may determine the AOA of the RF signal received from the external device 104, based on the determined phase difference of the RF signal, a wavelength of the received RF signal, and a physical distance between the first UWB antenna 211 and the second UWB antenna 212.

In an embodiment, the processor 220 may determine the position of the external device 104, based on the determined distance and the determined AOA.

In an embodiment, it is illustrated that the processor 220 controls the wireless communication circuit 230 (for example, the UWB IC 240) to determine the position of the external device 104, but this should not be considered as limiting. The wireless communication circuit 230 (for example, the UWB IC 240) may determine the position of the external device 104 by itself, based on the determined distance and the determined AOA.

However, the method for the processor 220 to determine the position of the external device 104 is not limited by the above-described example, and various methods usable by those skilled in the art may be applied.

Figure 3A:
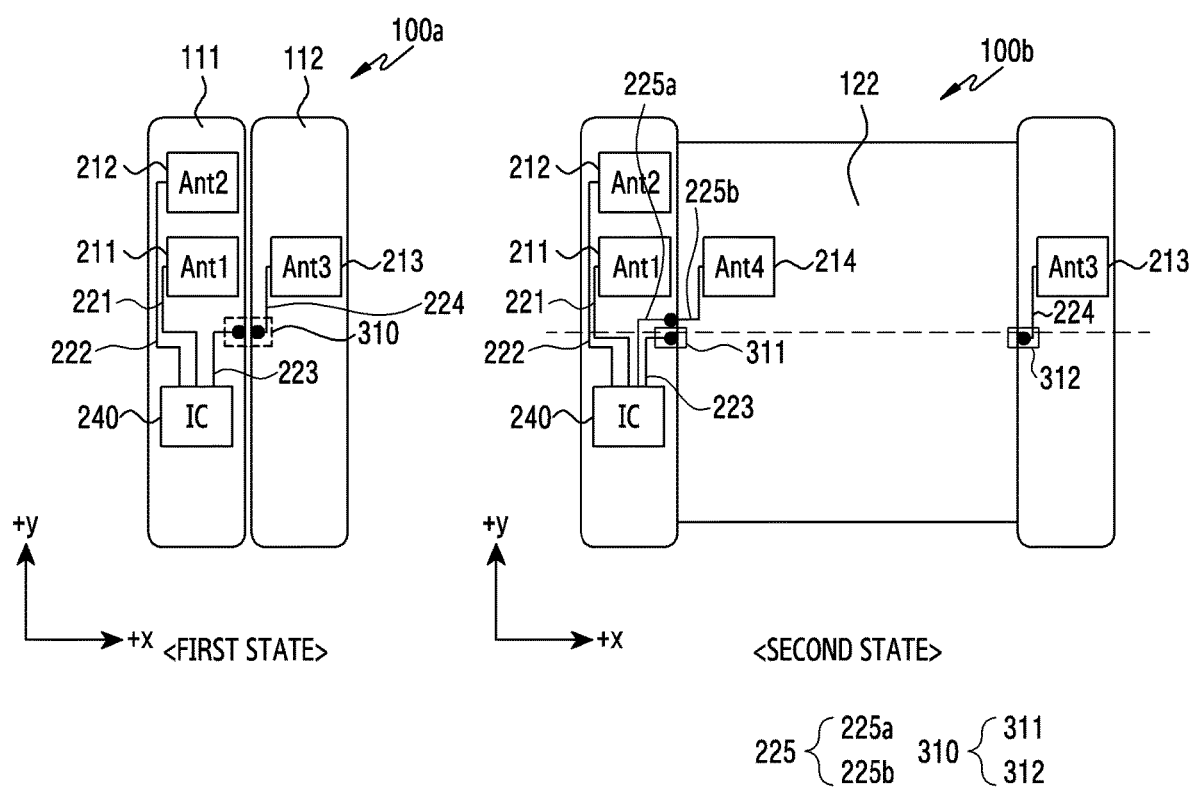
FIG. 3A is a view illustrating an electric connection structure between a UWB antenna and a UWB integrated circuit (IC) in the first state or the second state according to an embodiment of the disclosure.

FIG. 3A is a view illustrating an electric connection structure between a UWB antenna and a UWB IC in the first state or the second state according to an embodiment of the disclosure.

Referring to FIG. 3A, the electronic device 100 according to an embodiment may include a UWB antenna 210, a UWB IC 240, a first signal line 221, a second signal line 222, a third signal line 223, a fourth signal line 224, a fifth signal line 225, and a contact structure 310.

The UWB antenna 210 according to an embodiment may include a first UWB antenna 211, a second UWB antenna 212, a third UWB antenna 213, and/or a fourth UWB antenna 214. The same reference numerals are used for components which are the same as or substantially the same as those described above, and a redundant explanation is omitted.

The first UWB antenna 211 and the second UWB antenna 212 according to an embodiment may be disposed in the first housing 111 along a first axis (for example, y-axis) in a line with each other. In an embodiment, the first axis may be referred to as an axis that is substantially parallel to the y axis of FIG. 3A. However, the arrangement structure of the first UWB antenna 211 and the second UWB antenna 212 is not limited thereto.

According to an embodiment, the third UWB antenna 213 may be disposed in the second housing 112, and the third UWB antenna 213 may be disposed along a second axis (for example, x-axis) which is substantially perpendicular to the first axis, in a line with the first UWB antenna 211. In another example, at least part of the third UWB antenna 213 may be disposed along the second axis (for example, x-axis) substantially perpendicular to the first axis to overlap the first UWB antenna 211 or the second UWB antenna 212. In an embodiment, the second axis may be referred to as an axis which is substantially parallel to the x axis of FIG. 3A.

However, the arrangement structures of the first UWB antenna 211 and the third UWB antenna 213 is not limited thereto.

The fourth UWB antenna 214 according to an embodiment may be disposed in the main flexible display 122. In an embodiment, the fourth UWB antenna 214 may be disposed along the second axis (for example, x-axis) substantially perpendicular to the first axis in a line with the first UWB antenna 211. In another example, the fourth UWB antenna 214 may be disposed along the second axis (for example, x-axis) substantially perpendicular to the first axis (for example, y-axis) in a line with the third UWB antenna 213. In still another example, at least part of the fourth UWB antenna 214 may be disposed along the second axis (for example, x-axis) substantially perpendicular to the first axis (for example, y-axis) to overlap the first UWB antenna 211 or the second UWB antenna 212. However, the arrangement structure of the first UWB antenna 211 and the fourth UWB antenna 214 may not be limited thereto.

According to an embodiment, the fourth UWB antenna 214 may include an antenna pattern included in the main flexible display 122. For example, the main flexible display 122 may include a plurality of layers, and the plurality of layers of the main flexible display 122 may include at least one layer including an antenna pattern. In an example, the antenna pattern included in the main flexible display 122 may be electrically connected with the wireless communication circuit 230 (for example, the UWB IC 240) through the fifth signal line 225. In other words, the fourth UWB antenna 214 may be implemented through the antenna pattern disposed in the main flexible display 122. For example, the fourth UWB antenna 214 may correspond to a display antenna.

According to an embodiment, the antenna pattern included in the main flexible display 122 may include a metallic material having high conductivity (for example, silver (Ag), silver-alloy (Ag-alloy), aluminum (Al), aluminum-alloy (Al-alloy), copper (Cu), or copper-alloy (Cu-alloy)).

According to an embodiment, the UWB IC 240 may be disposed in the first housing 111. In an embodiment, the first UWB antenna 211 may be electrically connected with the UWB IC 240 through the first signal line 221. The second UWB antenna 212 may be electrically connected with the UWB IC 240 through the second signal line 222.

According to an embodiment, the first signal line 221, the second signal line 222, the third signal line 223, the fourth signal line 224, and/or the fifth signal line 225 may be implemented by a flexible printed circuit board (FPCB).

For example, the electronic device 100 may include a flexible printed circuit board (FPCB) having a bendable characteristic (or a flexible characteristic). In an example, the UWB IC 240 and the first UWB antenna 211 may be electrically connected through the flexible printed circuit board.

However, this should not be considered as limiting, and the first signal line 221, the second signal line 222, the third signal line 223, the fourth signal line 224, and/or the fifth signal line 225 may be implemented by a conductive connection member (for example, a coplanar waveguide (CPW) and/or micro strip line).

According to an embodiment, the contact structure 310 may include a first structure 311 and a second structure 312. In an embodiment, the first structure 311 may be electrically connected with the UWB IC 240 through the third signal line 223, and the second structure 312 may be electrically connected with the third UWB antenna 213 through the fourth signal line 224.

According to an embodiment, the third UWB antenna 213 may be electrically connected or may not be connected with the UWB IC 240 according to a state 100a, 100b of the electronic device 100. For example, when the electronic device 100 is in the first state 100a, the third UWB antenna 213 may be electrically connected with the UWB IC 240 through the contact structure 310. In another example, when the electronic device 100 is in the second state 100b, the first housing 111 and the second housing 112 may be spaced apart from each other more than a designated distance such that the third UWB antenna 213 is not electrically connected with the UWB IC 240.

According to an embodiment, the fourth UWB antenna 214 may be electrically connected or may not be connected with the UWB IC 240 according to a state 100a, 110b of the electronic device 100. For example, as the electronic device switches from the second state 100b to the first state 100a, a second portion 225b of the fifth signal line 225 may be entered into the first housing 111 or the second housing 112 along with the main flexible display 122. In this case, a first portion 225a of the fifth signal line 225 may not be electrically connected with the second portion 225b, and the fourth UWB antenna 214 and the UWB IC 240 may not be electrically connected.

In another example, as the electronic device switches from the first state 100a to the second state 100b, the second portion 225b may be exposed to the outside of the first housing 111 or the second housing 112. In this case, the first portion 225a and the second portion 225b of the fifth signal line 225 may be electrically connected, and the fourth UWB antenna 214 and the UWB IC 240 may be electrically connected. In an embodiment, the electronic device 100 may include a display connection structure, which will be described below in FIG. 10A. In the second state, the first portion 225a and the second portion 225b of the fifth signal line 225 may be electrically connected through the display connection structure.

According to an embodiment, the first UWB antenna 211, the second UWB antenna 212, and/or the third UWB antenna 213 may transmit or receive a UWB signal for data communication. For example, during short-range communication, the first UWB antenna 211 may transmit or receive a UWB signal for data (for example, video data) communication.

According to an embodiment, in the first state 100a, the processor 220 may control the UWB IC 240 to transmit and/or receive an RF signal of a designated frequency band, based on at least two of the first UWB antenna 211, the second UWB antenna 212, and the third UWB antenna 213.

For example, in the first state 100a, the processor 220 may control the UWB IC 240 to perform positioning based on at least two of the first UWB antenna 211, the second UWB antenna 212, and the third UWB antenna 213. In an example, the processor 220 may measure an AOA of the received RF signal, based on the first UWB antenna 211 and the second UWB antenna 212. In an embodiment, the processor 220 may determine a phase difference of the received RF signal by using an RF signal received by the first UWB antenna 211 and an RF signal received by the second UWB antenna 212. The processor 220 may determine the AOA of the received RF signal, based on the determined phase difference of the RF signal, a wavelength of the received RF signal, and a physical distance between the first UWB antenna 211 and the second UWB antenna

212. The processor 220 may determine a phase difference of the received RF signal, by using an RF signal received by the first UWB antenna 211 and an RF signal received by the third UWB antenna 213. The processor 220 may determine the AOA of the received RF signal, based on the determined phase difference of the RF signal, a wavelength of the received RF signal, and a physical distance between the first UWB antenna 211 and the third UWB antenna 213.

According to an embodiment, in the second state 100*b*, the processor 220 may control the UWB IC 240 to transmit and/or receive an RF signal of a designated frequency band, based on at least two of the first UWB antenna 211, the second UWB antenna 2121, and the fourth UWB antenna 214. For example, the processor 220 may perform positioning based on at least two of the first UWB antenna 211, the second UWB antenna 212, and the fourth UWB antenna 214.

According to an embodiment, in the second state 100*b*, the processor 220 may control the UWB IC 240 to perform positioning based on at least two of the first UWB antenna 211, the second UWB antenna 212, and the fourth UWB antenna 214, substantially in the same method as the method of performing positioning in the first state 100*a* as described above.

Figure 3B:
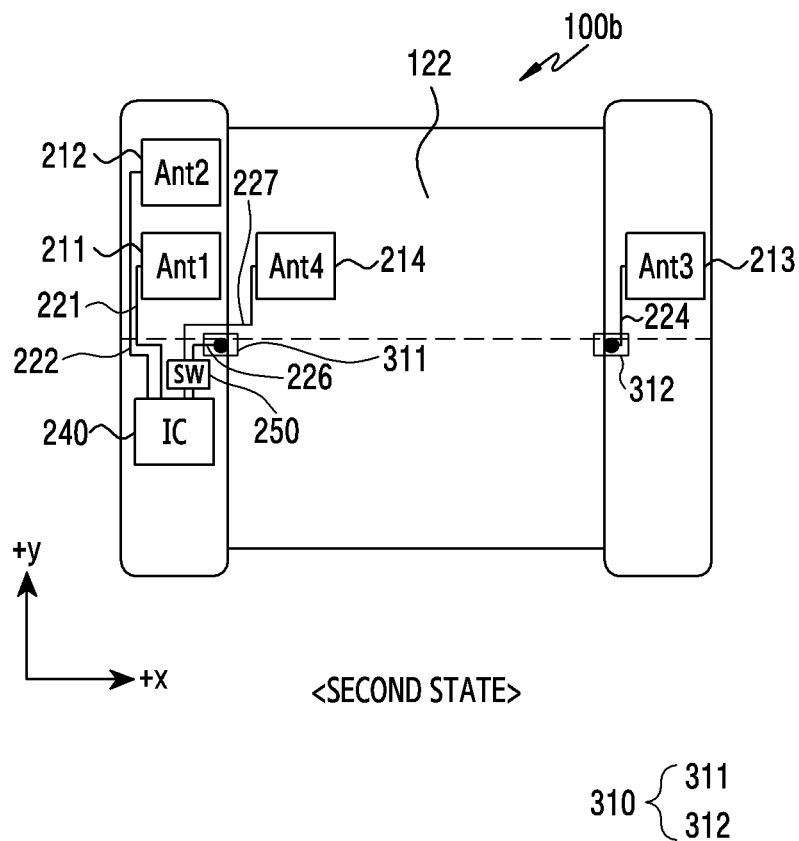
FIG. 3B is a view illustrating an electric connection structure between the UWB antenna and the UWB IC through control of a switching circuit according to an embodiment of the disclosure.

FIG. 3B is a view illustrating an electric connection structure between a UWB antenna and a UWB IC through control of a switching circuit according to an embodiment of the disclosure.

Referring to FIG. 3B, the electronic device 100 according to an embodiment may include a switching circuit 250, a sixth signal line 226, and a seventh signal line 227.

According to an embodiment, the switching circuit 250 may be electrically connected with the first structure 311 through the sixth signal line 226, and may be electrically connected with the fourth UWB antenna 214 through the seventh signal line 227.

According to an embodiment, the electronic device 100 may control an electric connection relationship between the third UWB antenna 213 and the fourth UWB antenna 214, and the UWB IC 240 through the switching circuit 250.

For example, the switching circuit 250 may short-circuit a port in the switching circuit 250 that is connected with the seventh signal line 227 in the second state 100*b*, and in this case, the switching circuit 250 may be electrically connected with the fourth UWB antenna 214 through the seventh signal line 227. For example, the UWB IC 240 electrically connected with the switching circuit 250 may be electrically connected with the fourth UWB antenna 214. In an embodiment, in the second state 100*b*, a port in the switching circuit 260 that is connected with the sixth signal line 226 may be opened.

In another example, the switching circuit 250 may short-circuit a port in the switching circuit 250 that is connected with the sixth signal line 226 in the first state 100*a*, and in this case, the switching circuit 250 may be electrically connected with the third UWB antenna 213 through the sixth signal line 226. For example, the UWB IC 240 connected with the switching circuit 250 may be electrically connected with the third UWB antenna 213 through the contact structure 310. In an embodiment, in the second state 100*b*, a port in the switching circuit 250 that is connected with the seventh signal line 227 may be opened, and the UWB IC 240 and the fourth UWB antenna 214 may not be electrically connected.

Figure 4A:
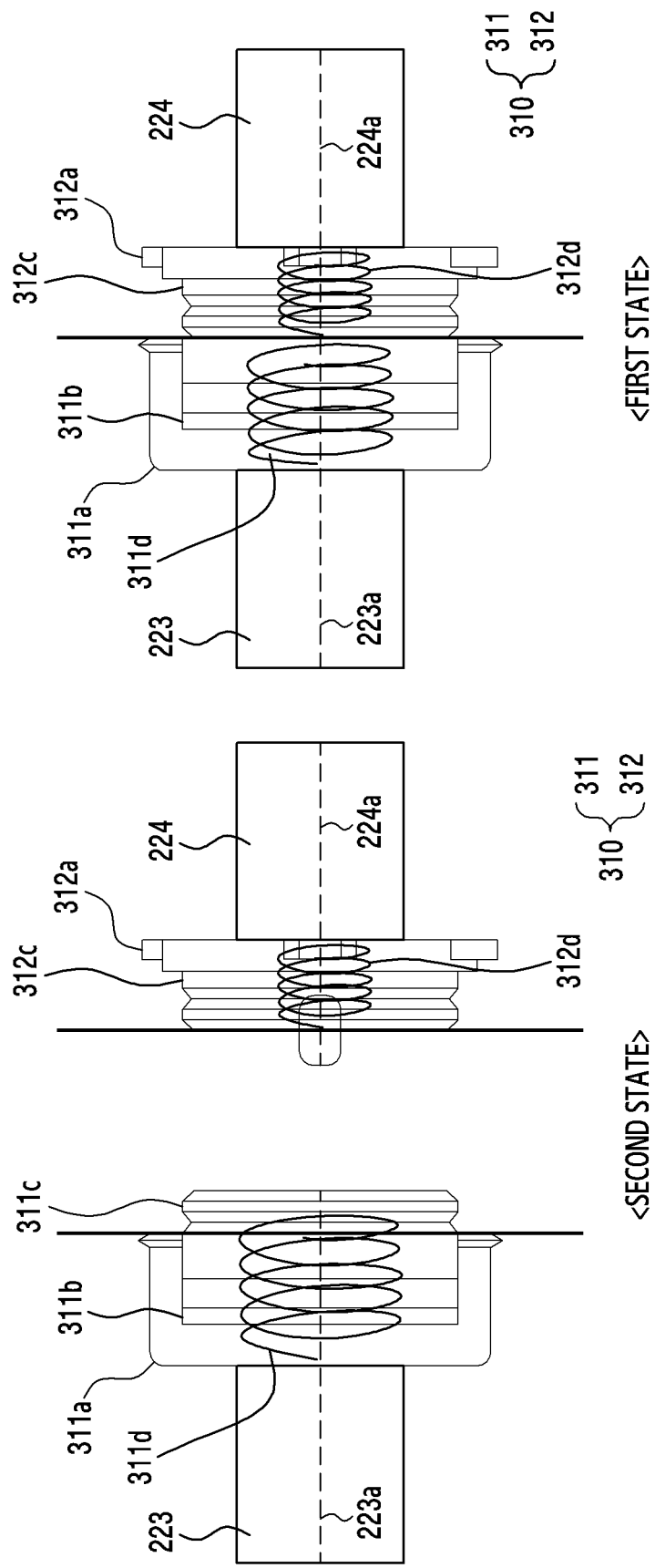
FIG. 4A is a view illustrating a contact structure when the electronic device is in the first state or the second state according to an embodiment of the disclosure.

FIG. 4A is a view illustrating the contact structure when the electronic device is in the first state or the second state according to an embodiment of the disclosure.

Figure 4B:
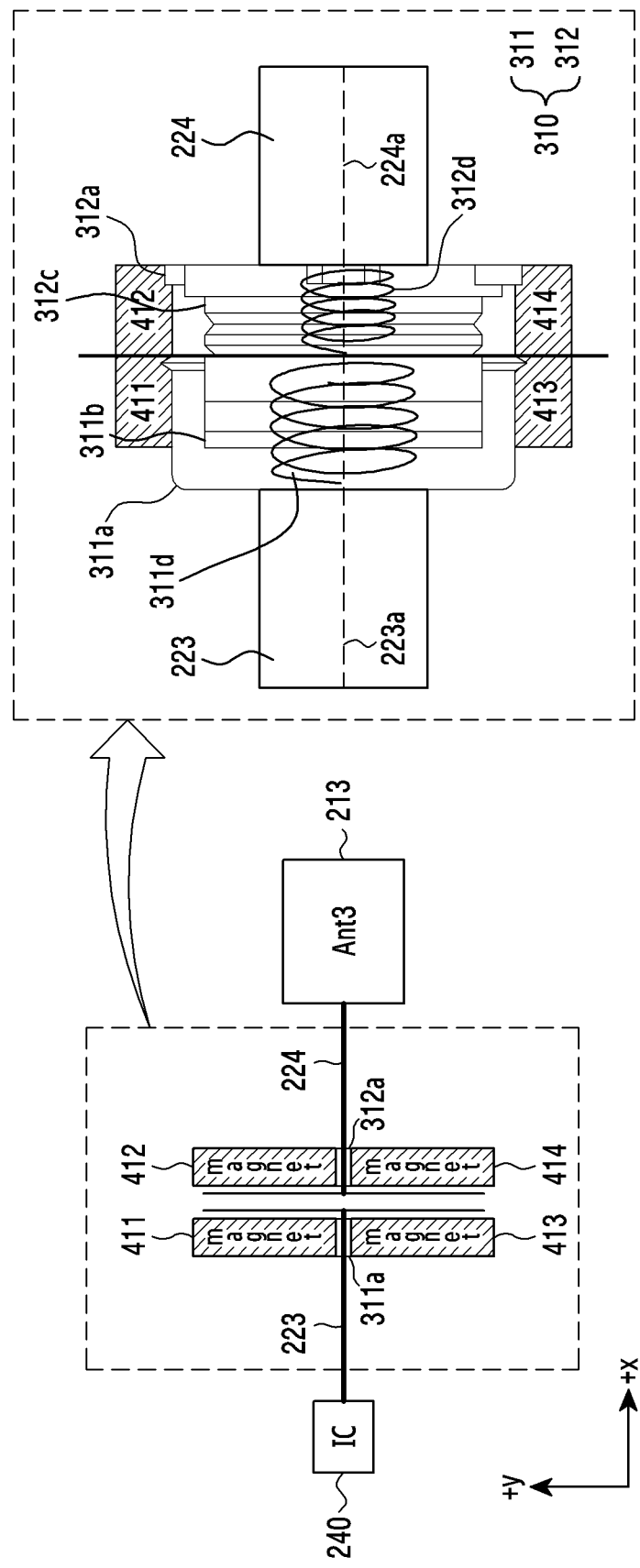
FIG. 4B is a view illustrating a magnet disposed in the contact structure according to an embodiment of the disclosure.

FIG. 4B is a view illustrating a magnet disposed in the contact structure according to an embodiment of the disclosure.

Referring to FIG. 4A, the electronic device 100 according to an embodiment may include the contact structure 310. In an embodiment, the contact structure 310 may include the first structure 311 and/or the second structure 312.

According to an embodiment, the first structure 311 may include a first coupling member 311*a*, a first connection member 311*b*, a first contact member 311*c*, and/or a first spring 311*d*. In an embodiment, the second structure 312 may include a second coupling member 312*a*, a second contact member 312*c*, and/or a second spring 312*d*.

According to an embodiment, the first structure 311 of the contact structure 310 may be disposed on one surface of the first housing 111 that faces the second housing 112 in the first state 100*a*. In an embodiment, the second structure 312 of the contact structure 310 may be disposed in the second housing 112 to correspond to a position of the first structure 311. For example, the second structure 312 of the contact structure 310 may be disposed on such a position of the second housing 112 that the second structure 312 comes into contact with the first structure 311 of the contact structure 310 in the first state 100*a* and is electrically connected therewith.

According to an embodiment, the first connection member 311*b* may be coupled with the first coupling member 311*a*, and the first contact member 311*c* may be coupled with the first connection member 311*b*. In an embodiment, the third signal line 223 may be formed by penetrating through the first coupling member 311*a*, the first connection member 311*b*, and/or the first contact member 311*c*. In another example, the third signal line 223 may be electrically connected with the first coupling member 311*a*, the first connection member 311*b*, and/or the first contact member 311*c*. In an embodiment, the first contact member 311*c* may be entered into the first connection member 311*b* or may be extended to the outside of the first connection member 311*b*.

According to an embodiment, the third signal line 223 may include a first centre core 223*a* disposed therein. In an embodiment, the first spring 311*d* may be disposed to wind around the first centre core 223*a*. In an embodiment, the first spring 311*d* may prevent a damage to the contact structure 310 by buffering a physical impact when the first structure 311 and the second structure 312 come into contact with each other in the first state 100*a*. In another embodiment, the first spring 311*d* may be omitted.

According to an embodiment, the second coupling member 312*a* may be coupled with the second contact member 312*c*. In an embodiment, the fourth signal line 224 may be formed by penetrating through the second coupling member 312*a* and/or the second contact member 312*c*. In another example, the fourth signal line 224 may be electrically connected with the second coupling member 312*a* and/or the second contact member 312*c*.

According to an embodiment, the fourth signal line 224 may include a second centre core 224*a*. In an embodiment, the second spring 312*d* may be disposed to wind around the second centre core 224*a*. In an embodiment, the second spring 312*d* may prevent a damage to the contact structure 310 by buffering a physical impact when the first structure 311 and the second structure 312 come into contact with each other in the first state 100*a*. In an embodiment, the second spring 312*d* may be omitted.

According to an embodiment, the first coupling member 311*a* and/or the first connection member 311*b* may correspond to an electric ground, and may enclose the third signal line 223. In an embodiment, the first contact member 311c, the second coupling member 312a, and the second contact member 312c may correspond to an electric ground, and may enclose the fourth signal line 224.

According to an embodiment, the third signal line 223 and the first structure 311 may be formed be a coaxial cable. According to another embodiment, the third signal line 223 and the first structure 311 may be formed by a structure similar to the coaxial cable.

According to an embodiment, the fourth signal line 224 and the second structure 312 may be formed be a coaxial cable. According to another embodiment, the fourth signal line 224 and the second structure 312 may be formed by a small structure similar to the coaxial cable.

According to an embodiment, the first structure 311 and the second structure 312 of the contact structure 310 may be connected or may not be connected according to a state 100a, 100b of the electronic device 100. For example, in the second state 100b where the first housing 111 and the second housing 112 are spaced apart from each other more than a designated distance, the first contact member 311c of the first structure 311 and the second contact member 312c of the second structure 312 may not be in contact with each other. In this case, the first centre core 223a and the second centre core 224a may not be electrically connected with each other, and accordingly, the first structure 311 and the second structure 312 may not be connected with each other.

In another example, as the electronic device 100 switches from the second state 100b to the first state 100a, the first housing 111 and the second housing 112 may move to be adjacent to each other. According to the movement, the first structure 311 disposed in a certain portion of the first housing 111 and the second structure 312 disposed in a certain portion of the second housing 112 may move to be adjacent to each other. In this case, the first contact member 311c and the second contact member 312c may come into contact with each other and the first structure 311 and the second structure 312 may be electrically connected with each other.

In an embodiment, in the first state 100a, the first structure 311 and the second structure 312 may be electrically connected such that the UWB IC 240 and the third UWB antenna 213 are electrically connected. For example, the first structure 311 and the second structure 312 may be electrically connected such that the third signal line 223 connected with the UWB IC 240 is electrically connected with the fourth signal line 224 connected with the third UWB antenna 213. Accordingly, the UWB IC 240 may be electrically connected with the third UWB antenna 213.

Referring to FIG. 4B, the contact structure 310 according to an embodiment may include a plurality of magnets. In an embodiment, the plurality of magnets may be disposed adjacent to the first coupling member 311a and the second coupling member 312a.

For example, the electronic device 100 may include a first magnet 411, a second magnet 412, a third magnet 413, and/or a fourth magnet 414. The first magnet 411, the second magnet 412, the third magnet 413, and/or the fourth magnet 414 may be disposed adjacent to the contact structure 310. The first magnet 411 may be disposed in the +y direction of the first coupling member 311a of the first structure 311, and the second magnet 412 having magnetism opposite to the first magnet 411 may be disposed in the +y direction of the second coupling member 312a of the second structure 312 corresponding to the position of the first magnet 411. The third magnet 413 may be disposed in the −y direction of the first coupling member 311a of the first structure 311, and the fourth magnet 414 having magnetism opposite to the third magnet 413 may be disposed in the −y direction of the second coupling member 312a of the second structure 312 corresponding to the position of the third magnet 413. However, the number of the plurality of magnets is not limited to the first magnet 411, the second magnet 412, the third magnet 413, and the fourth magnet 414, and the positions of the plurality of magnets are not limited to the embodiments.

According to an embodiment, in the first state 100a, the plurality of magnets may make it easy to bring the contact members 311c, 312c into contact with each other. For example, when the first contact member 311c and the second contact member 312c are close to each other by a designated distance or shorter, the first magnet 411 and the second magnet 412 may make it easy to bring the first contact member 311c and the second contact member 312c into contact with each other through a magnetic force.

Figure 5A:
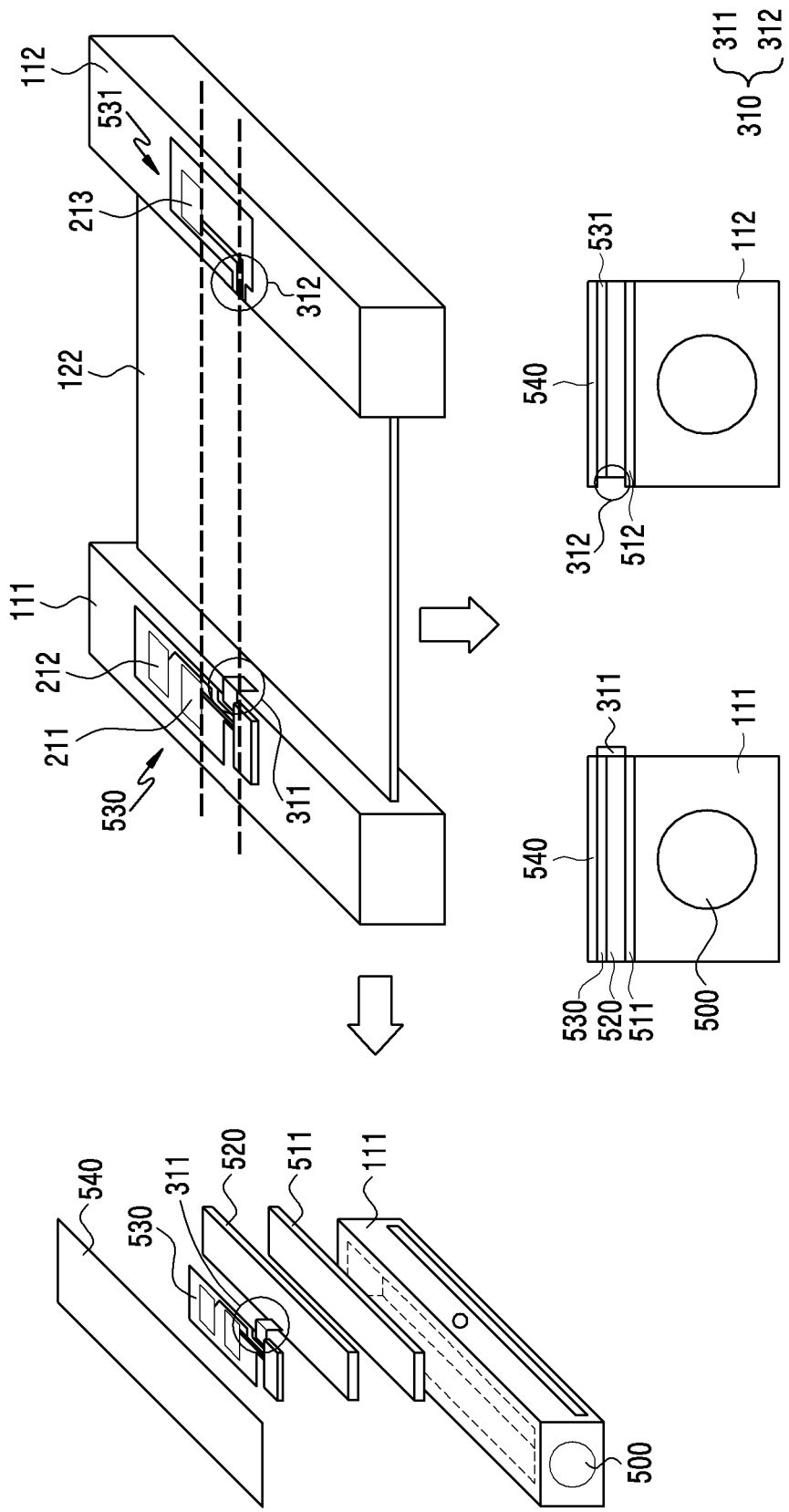
FIG. 5A is a view illustrating an inner structure of a housing including a UWB antenna and a UWB IC according to an embodiment of the disclosure.

FIG. 5A is a view illustrating an inner structure of a housing including a UWB antenna and a UWB IC according to an embodiment of the disclosure.

Figure 5B:
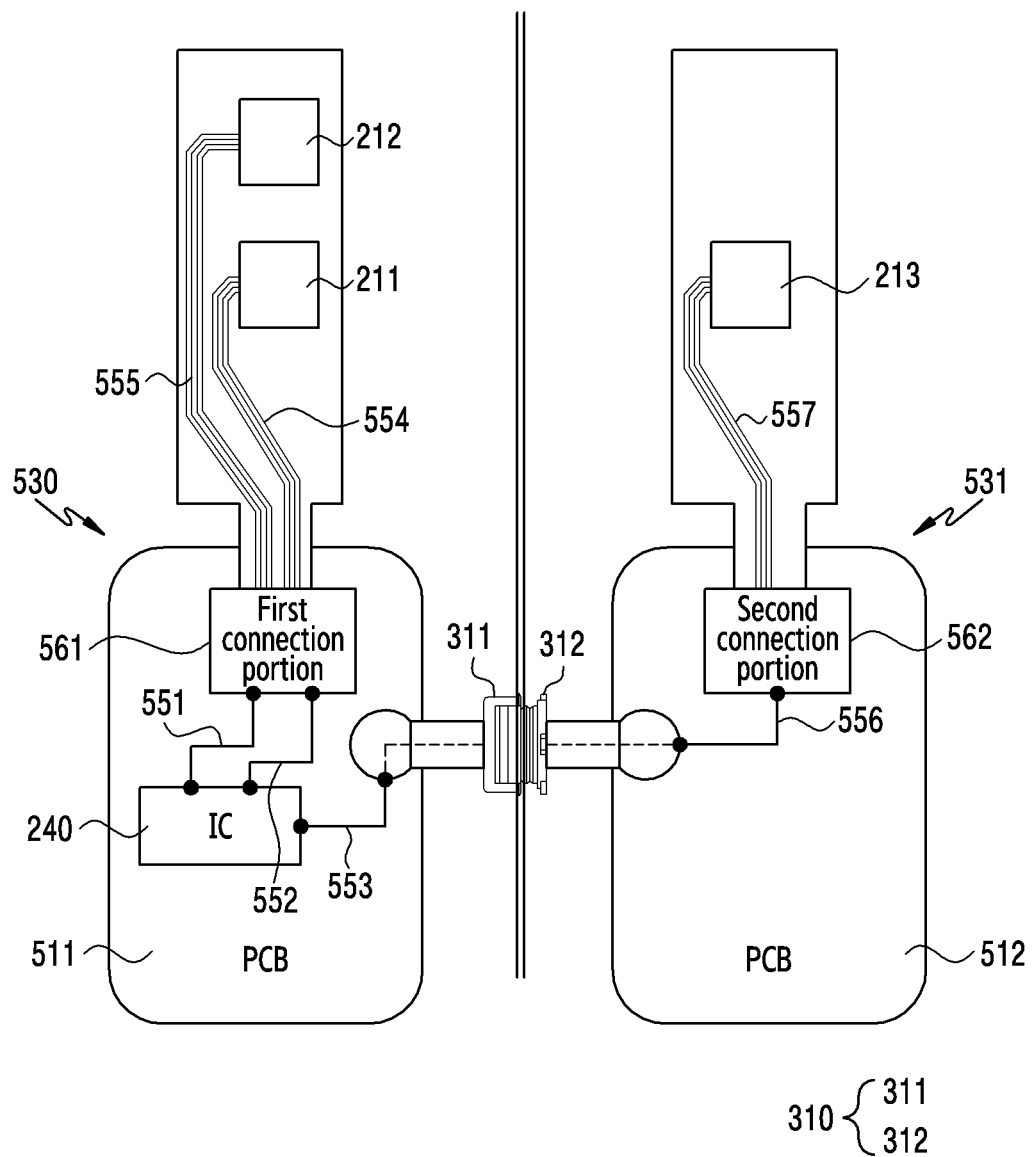
FIG. 5B is a view illustrating a connection structure between a UWB IC and a UWB antenna which are disposed on a printed circuit board according to an embodiment of the disclosure.

FIG. 5B is a view illustrating a connection structure of the UWB IC and the UWB antenna disposed on a printed circuit board according to an embodiment of the disclosure.

Referring to FIG. 5A, the first housing 111 according to an embodiment may include a roller unit 500, a first printed circuit board 511, a plate 520, an antenna and IC circuit 530, and a rear surface cover 540. The same reference numerals are used for components which are the same as or substantially the same as those described above, and a redundant explanation is omitted.

According to an embodiment, when the electronic device 100 switches from the second state 100b to the first state 100a, at least part of the main flexible display 122 may be entered into the first housing 111. For example, the entered main flexible display 122 may be rolled around the roller unit 500 disposed in the first housing 111. In an embodiment, the roller unit 500 may include a rotation shaft and a roller coupled to the rotation shaft. The roller included in the roller unit 500 may have, for example, a cylindrical shape. However, the roller is not limited to the cylindrical shape and may include other shapes.

According to an embodiment, a plurality of electronic components may be disposed on the first printed circuit board 511. In an embodiment, a wireless communication circuit (for example, the wireless communication circuit 230 of FIG. 2), a processor (for example, the processor 220 of FIG. 2), a memory, and/or an interface may be disposed on the first printed circuit board 511. In an embodiment, the first printed circuit board 511 may include a conductive layer.

According to an embodiment, the second housing 112 may correspond to the first housing 111 described above, and may include a roller unit, a second printed circuit board 512, a plate, a rear surface cover and/or an antenna circuit 531.

Referring to FIG. 5B, the UWB IC 240 included in the antenna and IC circuit 530 according to an embodiment may be disposed on the first printed circuit board 511. In another embodiment, the UWB IC 240 may be disposed on the second printed circuit board 512.

According to an embodiment, the antenna and IC circuit 530 may include the first UWB antenna 211, the second UWB antenna 212, and/or the UWB IC 240.

According to an embodiment, the antenna and IC circuit 530 may include a first connection portion 561 to electrically connect the first UWB antenna 211 and the second UWB antenna 212 with the UWB IC 240. For example, the UWB IC 240 disposed on the first printed circuit board 511 may be electrically connected with the first connection portion 561 through a first conductive connection member 551 and a second conductive connection member 552. In an example, the first connection portion 561 may be electrically connected with the first UWB antenna 211 through a first transmission line 554, and may be electrically connected with the second UWB antenna 212 through a second transmission line 555. In an embodiment, the UWB IC 240 may be electrically connected with the first structure 311 through a third conductive connection member 553.

According to an embodiment, the antenna circuit 531 may include the third UWB antenna 213. In an embodiment, the antenna circuit 531 may include a second connection portion 562 to electrically connect the third UWB antenna 213 with the second structure 312 of the contact structure 310. For example, the second structure 312 may be electrically connected with the second connection portion 562 through a fourth conductive connection member 556, and the second connection portion 562 may be electrically connected with the third UWB antenna 213 through a third transmission line 557.

According to an embodiment, the wireless communication circuit 230 may feed the first UWB antenna 211 through the first transmission line 554, and may feed the second UWB antenna 212 through the second transmission line 555. The wireless communication circuit 230 may transmit and/or receive an RF signal of a designated frequency band by using the first UWB antenna 211 and/or the second UWB antenna 212.

According to an embodiment, the wireless communication circuit 230 disposed on the first printed circuit board 511 may feed the third UWB antenna 213. The wireless communication circuit 230 may transmit and/or receive an RF signal of a designated frequency band by using the third UWB antenna 213.

Figure 6:
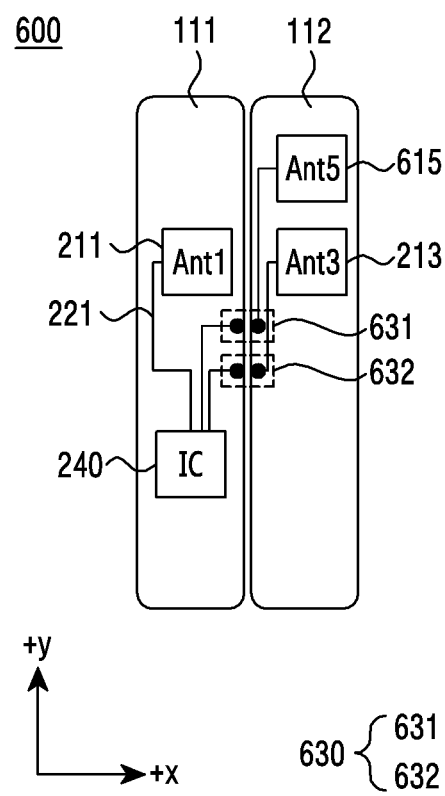
FIG. 6 is a view illustrating a UWB antenna arrangement structure in the first state according to an embodiment of the disclosure.

FIG. 6 is a view illustrating a UWB antenna arrangement structure in the first state according to an embodiment of the disclosure.

Referring to FIG. 6, the electronic device 600 may include a fifth UWB antenna 615 and a contact structure 630. In an embodiment, the contact structure 630 may include a first contact structure 631 and a second contact structure 632. The same reference numerals are used for components which are the same as or substantially the same as those described above, and a redundant explanation is omitted.

According to an embodiment, the fifth UWB antenna 615 and the third UWB antenna 213 may be disposed in the second housing 112 along a first axis. In an embodiment, the first axis may be referred to as an axis that is substantially parallel to the y-axis.

According to an embodiment, the first UWB antenna 211 and the third UWB antenna 213 may be disposed along a second axis which is substantially perpendicular to the first axis. For example, the first UWB antenna 211 may be disposed in the first housing 111 along the second axis, and the third UWB antenna 213 may be disposed in the second housing 112 along the second axis.

According to an embodiment, in the first state 100a, the UWB IC 240 may be electrically connected with the first UWB antenna 211, the fifth UWB antenna 615, and the third UWB antenna 213. For example, the UWB IC 240 may be electrically connected with the first UWB antenna 211 through the first signal line 221. In another example, the UWB IC 240 may be electrically connected with the fifth UWB antenna 615 through the first contact structure 631. In another example, the UWB IC 240 may be electrically connected with the third UWB antenna 213 through the second contact structure 632.

According to an embodiment, in the first state 100a, the processor 220 may control the UWB IC 240 to transmit and/or receive an RF signal of a designated frequency band, based on at least two of the first UWB antenna 211, the fifth UWB antenna 615, and the third UWB antenna 213. For example, the processor 220 may perform positioning based on at least two of the first UWB antenna 211, the fifth UWB antenna 615, and the third UWB antenna 213. The operation of performing positioning under control of the processor 220 is substantially the same as the above-described operations and thus a detailed description thereof is omitted.

According to an embodiment, the electronic device 100 may include an additional UWB antenna (not shown) and/or the fourth UWB antenna 214, and the additional UWB antenna and the fourth UWB antenna 214 may be disposed in the main flexible display 122 along the first axis. In an embodiment, the first axis may refer to an axis that is parallel to the +y axis.

According to an embodiment, the additional UWB antenna and the fifth UWB antenna 615 may be disposed along the second axis. In an embodiment, the second axis may refer to an axis that is parallel to the +x axis. For example, the additional UWB antenna may be disposed in the main flexible display 122 along the second axis, and the fifth UWB antenna 615 may be disposed in the second housing 112 along the second axis.

According to an embodiment, the fourth UWB antenna 214 and the third UWB antenna 213 may be disposed along a third axis, and the third axis in an embodiment may refer to an axis that is parallel to the +x axis. For example, the fourth UWB antenna 214 may be disposed in the main flexible display 122 along the third axis, and the third UWB antenna 213 may be disposed in the second housing 112 along the third axis.

According to an embodiment, in the second state 100b, the processor 220 may control the UWB IC 240 to transmit and/or receive an RF signal of a designated frequency band, based on at least two of the first UWB antenna 211, the additional UWB antenna, and the fourth UWB antenna 214. For example, the processor 220 may perform positioning based on at least two of the first UWB antenna 211, the additional UWB antenna, and the fourth UWB antenna 214. The operation of performing positioning under control of the processor 220 is substantially the same as the above-described operation and thus a detailed description thereof is omitted.

Figure 7A:
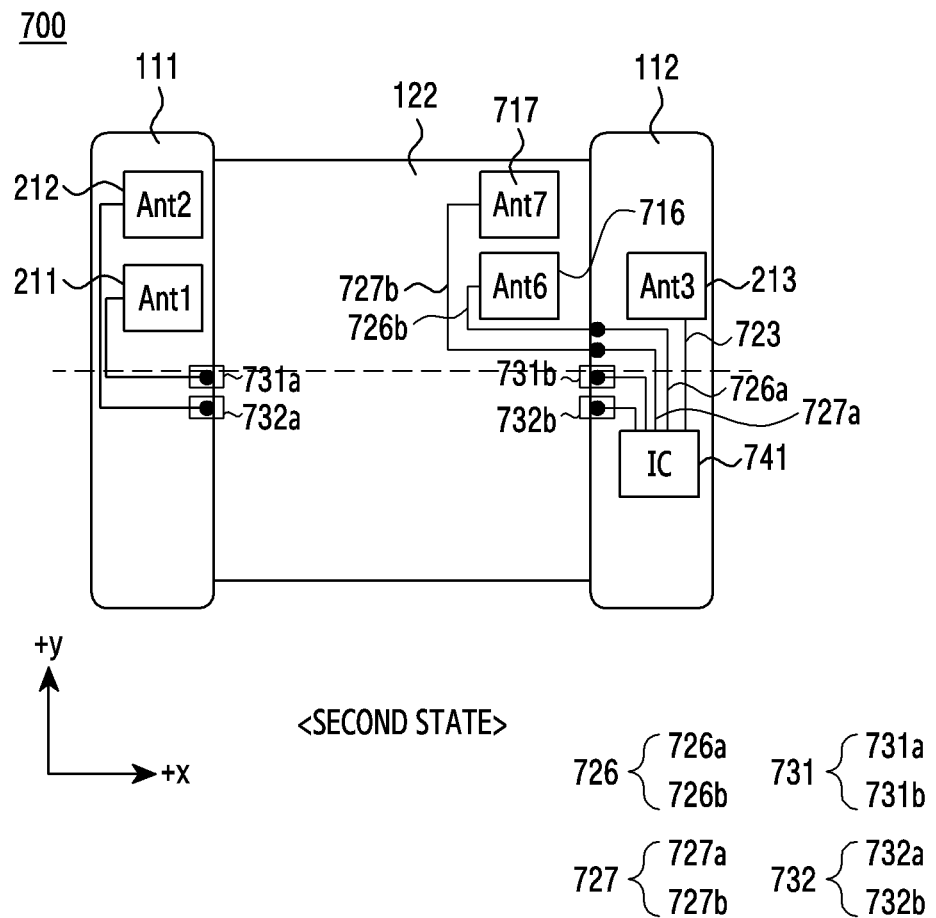
FIG. 7A is a view illustrating a UWB antenna arrangement structure in which a sixth UWB antenna and a seventh UWB antenna are added to a display in the second state according to an embodiment of the disclosure.

FIG. 7A is a view illustrating a UWB antenna arrangement structure in which a sixth UWB antenna and a seventh UWB antenna are added to the display in the second state according to an embodiment of the disclosure.

Referring to FIG. 7A, the electronic device 700 according to an embodiment may include the sixth UWB antenna 716, the seventh UWB antenna 717, and/or a UWB IC 741. In an embodiment, the electronic device 700 may include a third contact structure 731 and a fourth contact structure 732. In an embodiment, the third contact structure 731 may include a first structure 731a and/or a second structure 731b, and the fourth contact structure 732 may include a third structure 732a and/or a fourth structure 732b. The same reference numerals are used for components which are the same as or substantially the same as those described above, and a redundant explanation is omitted.

According to an embodiment, the sixth UWB antenna 716 and the third UWB antenna 213 may be disposed along a second axis. In an embodiment, the sixth UWB antenna 716 may be disposed in the main flexible display 122 along the second axis (for example, x-axis), and the third UWB antenna 213 may be disposed in the second housing 112 along the second axis. In an embodiment, the second axis may be referred to as an axis which is parallel to the x-axis of FIGS. 7A and 7B.

According to an embodiment, the seventh UWB antenna 717 and the sixth UWB antenna 716 may be disposed in the main flexible display 122 in parallel with a first axis. In an embodiment, the first axis may be referred to as an axis which is parallel to the y-axis of FIGS. 7A and 7B.

According to an embodiment, the UWB IC 741 may be disposed in the second housing 112. In an embodiment, the UWB IC 741 may be electrically connected with the third UWB antenna 213 through an eighth signal line 723.

According to an embodiment, the sixth UWB antenna 716 may be electrically connected or may not be connected with the UWB IC 741 according to a state 100a, 100b of the electronic device 700. For example, a second portion 726b of a ninth signal line 726 may be entered into the first housing 111 or the second housing 112 along with the main flexible display 122 as the electronic device switches from the second state 100b to the first state 100a. In this case, a first portion 726a of the ninth signal line 726 may not be electrically connected with the second portion 726b, and the sixth UWB antenna 716 and the UWB IC 741 may not be electrically connected. In another example, as the electronic device switches from the first state 100a to the second state 100b, the second portion 726b may be exposed to the outside of the first housing 111 or the second housing 112. In this case, the first portion 726a and the second portion 726b of the ninth signal line 726 may be electrically connected, and the sixth UWB antenna 716 and the UWB IC 741 may be electrically connected. According to an embodiment, the electronic device 700 may include a display connection structure which will be described below with reference to FIG. 10A. In the second state 100b, the first portion 726a and the second portion 726b of the ninth signal line 726 may be electrically connected through the display connection structure.

According to an embodiment, the seventh UWB antenna 717 may be electrically connected or may not be connected with the UWB IC 741 according to a state 100a, 100b of the electronic device 700. For example, a second portion 727b of a tenth signal line 727 may be entered into the first housing 111 or the second housing 112 along with the main flexible display 122 as the electronic device switches from the second state 100b to the first state 100a. In this case, a first portion 727a of the tenth signal line 727 may not be electrically connected with a second portion 727b, and the seventh UWB antenna 717 and the UWB IC 741 may not be electrically connected. In another example, as the electronic device switches from the first state 100a to the second state 100b, the second portion 727b may be exposed to the outside of the first housing 111 or the second housing 112. In this case, the first portion 727a and the second portion 727b of the tenth signal line 727 may be electrically connected, and the seventh UWB antenna 717 and the UWB IC 741 may be electrically connected. According to an embodiment, the electronic device 700 may include the display connection structure which will be described with reference to FIG. 10A. In the second state 100b, the first portion 727a and the second portion 727b of the tenth signal line 727 may be electrically connected through the display connection structure.

According to an embodiment, the first UWB antenna 211 may be electrically connected with or may not be connected with the UWB IC 741 according to a state 100a, 100b of the electronic device 700. For example, in the first state 100a, the UWB IC 741 may be electrically connected with the first UWB antenna 211 through the third contact structure 731. In the second state 100b, the UWB IC 741 may not be electrically connected with the first UWB antenna 211 as the first housing 111 and the second housing 112 are spaced apart from each other more than a designated distance.

According to an embodiment, the second UWB antenna 212 may be electrically connected or may not be connected with the UWB IC 741 according to a state 100a, 110b of the electronic device 700.

For example, in the first state 100a, the UWB IC 741 may be electrically connected with the second UWB antenna 212 through the fourth contact structure 732. In the second state 100b, the UWB IC 741 may not be electrically connected with the second UWB antenna 212 as the first housing 111 and the second housing 112 are spaced apart from each other more than a designated distance.

According to an embodiment, in the first state 100a, the UWB IC 741 may transmit and/or receive an RF signal of a designated frequency band, based on at least two of the first UWB antenna 211, the second UWB antenna 212, and the third UWB antenna 213. For example, the UWB IC 741 may perform positioning based on at least two of the first UWB antenna 211, the second UWB antenna 212, and the third UWB antenna 213.

According to an embodiment, in the second state 100b, the UWB IC 741 may transmit and/or receive an RF signal of a designated frequency band, based on at least two of the third UWB antenna 213, the sixth UWB antenna 716, and the seventh UWB antenna 717, in substantially the same way as in the first state 100a. For example, in the second state 100b, the UWB IC 741 may perform positioning based on at least two of the third UWB antenna 213, the sixth UWB antenna 716, and the seventh UWB antenna 717.

Figure 7B:
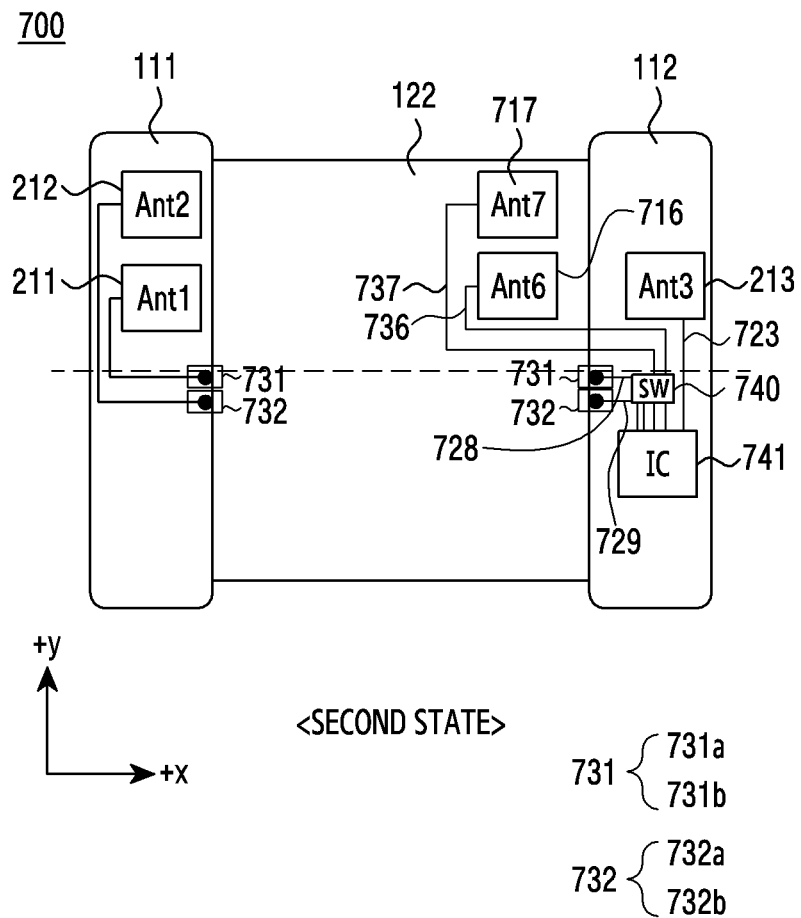
FIG. 7B is a view illustrating a UWB antenna arrangement structure in which a switching circuit, the sixth UWB antenna, and the seventh UWB antenna are added to the display in the second state according to an embodiment of the disclosure.

FIG. 7B is a view illustrating a UWB antenna arrangement structure in which a switching circuit, the sixth UWB antenna, and the seventh UWB antenna are added to the display in the second state according to an embodiment of the disclosure.

Referring to FIG. 7B, according to an embodiment, the electronic device 700 may include a switching circuit 740, an eleventh signal line 736, a twelfth signal line 737, a thirteenth signal line 728, and/or a fourteenth signal line 729. In an embodiment, the third contact structure 731 may include the first structure 731a and/or the second structure 731b, and the fourth contact structure 732 may include the third structure 732a and/or the fourth structure 732b.

According to an embodiment, the UWB IC 741 may be electrically connected with the sixth UWB antenna 716 through the eleventh signal line 736, and the UWB IC 741 may be electrically connected with the seventh UWB antenna 717 through the twelfth signal line 737.

According to an embodiment, the switching circuit 740 may be electrically connected with the second structure 731b through the thirteenth signal line 728, and may be electrically connected with the fourth structure 732b through the fourteenth signal line 729. The switching circuit 740 may be electrically connected with the third UWB antenna 213 through the eighth signal line 723.

According to an embodiment, the electronic device 100 may control an electric connection relationship between the first UWB antenna 211, the second UWB antenna 212, the sixth UWB antenna 716 and/or the seventh UWB antenna 717, and the UWB IC 741.

For example, in the second state 100b, the switching circuit 740 may short-circuit a port in the switching circuit 740 that is connected with the eleventh signal line 736. In this case, the switching circuit 740 may be electrically connected with the sixth UWB antenna 716 through the eleventh signal line 736. Accordingly, the UWB IC 741 connected with the switching circuit 740 may be electrically connected with the sixth UWB antenna 716. In another example, in the second state 100b, the switching circuit 740 may short-circuit a port in the switching circuit 740 that is connected with the twelfth signal line 737, and in this case, the switching circuit 740 may be electrically connected with the seventh UWB antenna 717 through the twelfth signal line 737. Accordingly, the UWB IC 741 connected with the switching circuit 740 may be electrically connected with the seventh UWB antenna 717. In an embodiment, in the second state 100b, a port of the switching circuit 740 that is connected with the thirteenth signal line 728 and/or the fourteenth signal line 729 may be opened.

In another example, in the first state 100a, the switching circuit 740 may short-circuit a port in the switching circuit 740 that is connected with the thirteenth signal line 728, and in this case, the switching circuit 740 may be electrically connected with the first UWB antenna 211 through the thirteenth signal line 728. Accordingly, the UWB IC 741 connected with the switching circuit 740 may be electrically connected with the first UWB antenna 211. In still another example, in the first state 100a, the switching circuit 740 may short-circuit a port in the switching circuit 740 that is connected with the fourteenth signal line 729, and in this case, the switching circuit 740 may be electrically connected with the second UWB antenna 212 through the fourteenth signal line 729. Accordingly, the UWB IC 741 connected with the switching circuit 740 may be electrically connected with the second UWB antenna 212.

In an embodiment, in the second state 100b, a port in the switching circuit 740 that is connected with the eleventh signal line 736 and the twelfth signal line 737 may be opened, and the UWB IC 741 and the sixth UWB antenna 716 and/or the seventh UWB antenna 717 may not be electrically connected.

Figure 8A:
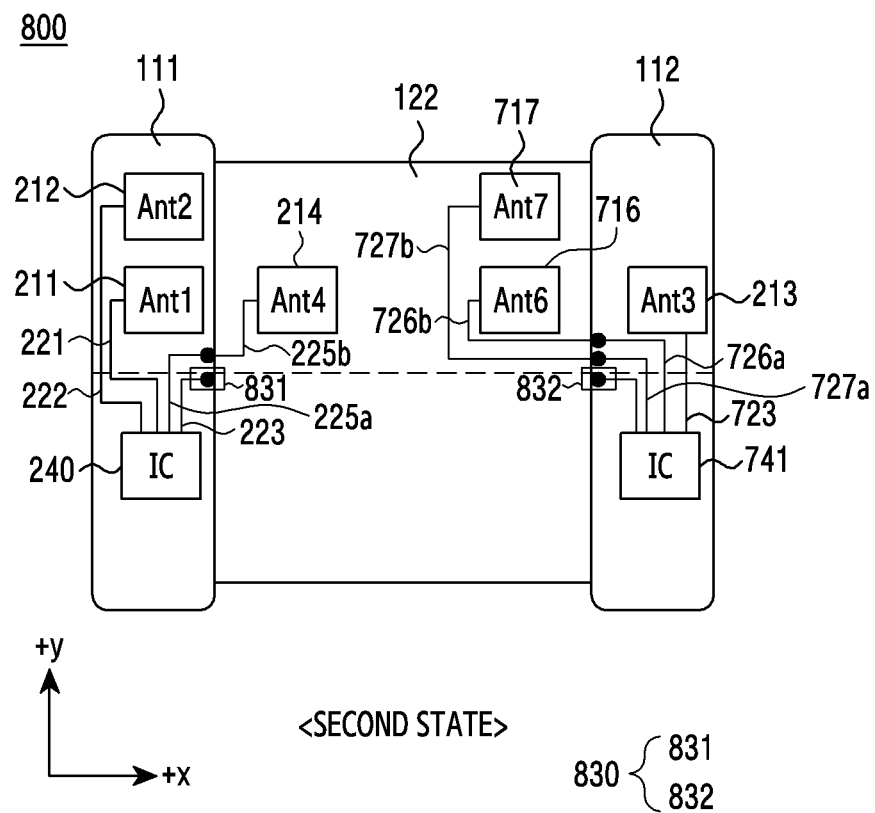
FIG. 8A is a view illustrating an arrangement structure of a UWB antenna in an electronic device including a first UWB IC and a second UWB IC according to an embodiment of the disclosure.

FIG. 8A is a view illustrating an arrangement structure of a UWB antenna in an electronic device including a first UWB IC and a second UWB IC according to an embodiment of the disclosure.

Referring to FIG. 8A, the electronic device 800 may include a first UWB IC 240, a second UWB IC 741, a first UWB antenna 211, a second UWB antenna 212, a third UWB antenna 213, a fourth UWB antenna 214, a sixth UWB antenna 716 and/or a seventh UWB antenna 717. In an embodiment, the electronic device may include a contact structure 830, and the contact structure 830 may include a first structure 831 and/or a second structure 832. The same reference numerals are used for components which are the same as or substantially the same as those described above, and a redundant explanation is omitted.

In an embodiment, the first UWB IC 240 may be referred to as the UWB IC 240 of FIG. 6. In an embodiment, the second UWB IC 741 may be referred to as the UWB IC 741 of FIGS. 7A and 7B.

In an embodiment, in the first state 100a, the processor 220 may transmit and/or receive an RF signal of a designated frequency band, based on at least two of the first UWB antenna 211, the second UWB antenna 212, and the third UWB antenna 213, through the first UWB IC 240. For example, the processor 220 may perform positioning based on at least two of the first UWB antenna 211, the second UWB antenna 212, and the third UWB antenna 213, through the first UWB IC 240. In an embodiment, in the second state 100b, the processor 220 may transmit and/or receive an RF signal of a designated frequency band, based on at least two of the first UWB antenna 211, the second UWB antenna 212, and the fourth UWB antenna 214, through the first UWB IC 240. For example, the processor 220 may perform positioning based on at least two of the first UWB antenna 211, the second UWB antenna 212, and the fourth UWB antenna 214, through the first UWB IC 240.

According to an embodiment, in the first state 100a, the processor 220 may transmit and/or receive an RF signal of a designated frequency band, based on at least two of the first UWB antenna 211, the second UWB antenna 212, and the third UWB antenna 213, through the second UWB IC 741. For example, the processor 220 may perform positioning based on at least two of the first UWB antenna 211, the second UWB antenna 212, and the third UWB antenna 213, through the second UWB IC 741. In an embodiment, in the second state 100b, the processor 220 may transmit and/or receive an RF signal of a designated frequency band, based on at least two of the third UWB antenna 213, the sixth UWB antenna 716, and the seventh UWB antenna 717, through the second UWB IC 741. For example, in the second state 100b, the processor 220 may perform positioning based on at least two of the third UWB antenna 213, the sixth UWB antenna 716, and the seventh UWB antenna 717, through the second UWB IC 741.

According to an embodiment, the processor 220 may perform positioning through at least one of the first UWB IC 240 and the second UWB IC 741 in the first state 100a. For example, when the processor 220 performs positioning through the second UWB IC 741 in the first state 100a, a data transmission length between the first UWB antenna 211 and the second UWB antenna 212, and the second UWB IC 741 may be elongated and thus a loss may occur. Accordingly, the processor 220 may perform positioning through the first UWB IC 240 in the first state 100a.

According to an embodiment, the processor 220 may perform positioning selectively through the first UWB IC 240 or the second UWB IC 741 in the second state 100b. For example, when the third UWB antenna 213 included in the second housing 112 is influenced by user's body in the second state 100b, and a received signal strength indication (RSSI) is reduced (for example, when the user grips the second housing 112 with user's hand), the processor 220 may perform positioning based on at least two of the first UWB antenna 211, the second UWB antenna 212, and the fourth UWB antenna 214, through the first UWB IC 240.

In another example, in the second state 100b, when the first UWB antenna 211 and/or the second UWB antenna 212 included in the first housing 111 is influenced by an external hindering member (for example, metal) hindering antenna radiation, and antenna radiation performance is degraded, the processor 220 may perform positioning based on at least two of the third UWB antenna 213, the sixth UWB antenna 716, and the seventh UWB antenna 717, through the second UWB IC 741.

Figure 8B:
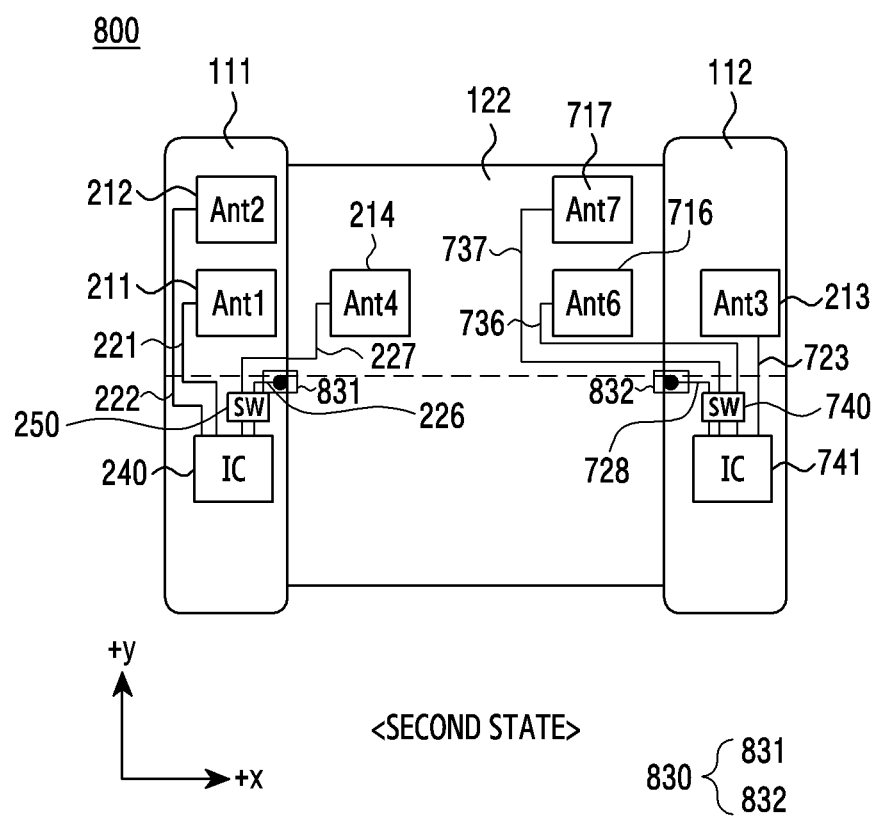
FIG. 8B is a view illustrating a UWB antenna arrangement structure in which a switching circuit is added to the electronic device including first UWB IC and the second UWB IC according to an embodiment of the disclosure.

FIG. 8B is a view illustrating a UWB antenna arrangement structure in which a switching circuit is added in the electronic device including the first UWB IC and the second UWB IC according to an embodiment of the disclosure.

Referring to FIG. 8B, the electronic device 800 according to an embodiment may include the contact structure 830. In an embodiment, the contact structure 830 may include the first structure 831 and/or the second structure 832. The same reference numerals are used for components which are the same as or substantially the same as those described above, and a redundant explanation is omitted.

According to an embodiment, a first switching circuit 250 may be referred to as the switching circuit 250 of FIG. 3B, and a second switching circuit 740 may be referred to as the switching circuit 740 of FIG. 7B.

According to an embodiment, an electric connection relationship between the first UWB IC 240 and the first UWB antenna 211, the second UWB antenna 212, the third UWB antenna 213, and/or the fourth UWB antenna 214 according to a state 100a, 100b of the electronic device 800 may be substantially the same as that described in FIG. 3B, and an explanation thereof is omitted. However, when the first UWB IC 240 is connected with the third UWB antenna 213 in the first state 100a, the first UWB IC 240 may be electrically connected through the contact structure 830, the second switching circuit 740, the second UWB IC 741, and the eighth signal line 723, which is different from FIG. 3B.

According to an embodiment, an electric connection relationship between the second UWB IC 741 and the first UWB antenna 211, the second UWB antenna 212, the third UWB antenna 213, the sixth UWB antenna 716 and/or the seventh UWB antenna 717 according to a state 100a, 100b of the electronic device 800 may be substantially the same as that described in FIG. 7B, and an explanation thereof is omitted. However, when the second UWB IC 741 is connected with the first UWB antenna 211 in the first state 100a, the second UWB IC 741 may be electrically connected through the contact structure 830, the sixth signal line 226, the first switching circuit 250, the first UWB IC 240, and the first signal line 221, which is different from FIG. 7B. In another example, when the second UWB IC 741 is electrically connected with the second UWB antenna 212 in the first state 100a, the second UWB IC 741 may be electrically connected through the contact structure 830, the sixth signal line 226, the first switching circuit 250, the first UWB IC 240, and the second signal line 222, which is different from FIG. 7B.

Figure 9A:
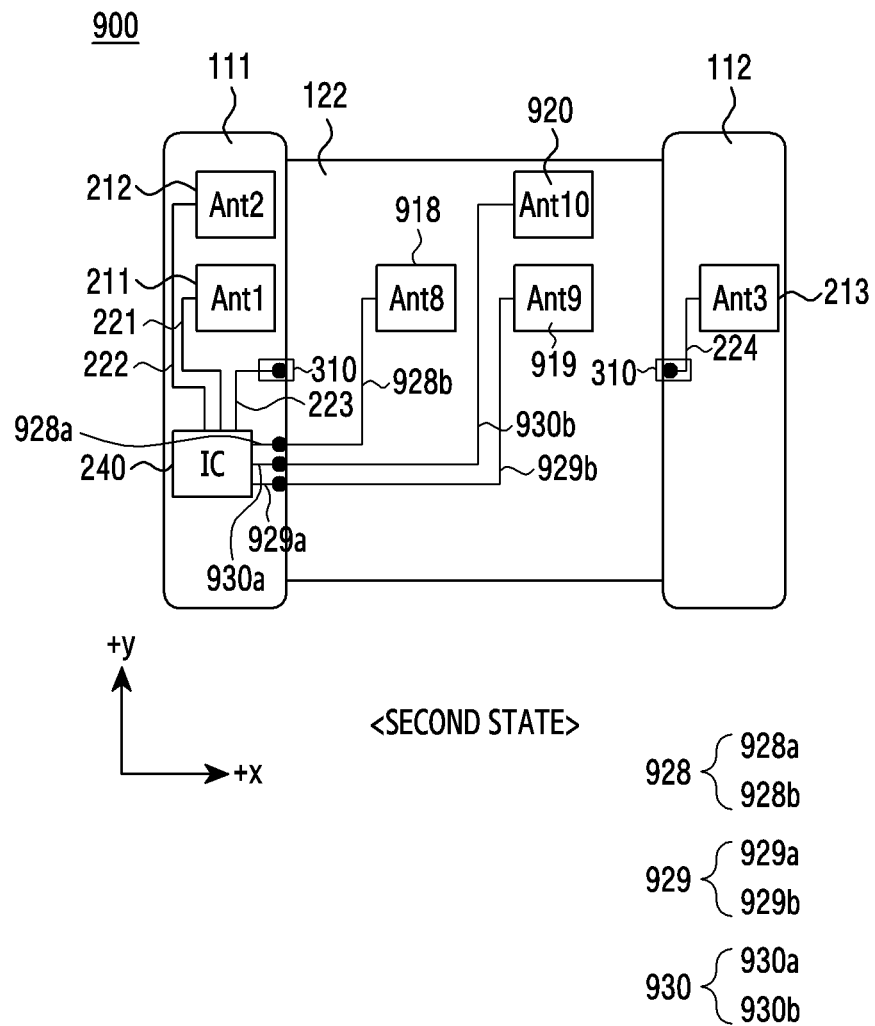
FIG. 9A is a view illustrating a UWB antenna arrangement structure in which an eighth UWB antenna, a ninth UWB antenna, and a tenth UWB antenna are disposed in a display in the second state according to an embodiment of the disclosure.

FIG. 9A is a view illustrating a UWB antenna arrangement structure in which an eighth UWB antenna, a ninth UWB antenna, and a tenth UWB antenna are disposed in the display in the second state according to an embodiment of the disclosure.

Referring to FIG. 9A, according to an embodiment, the electronic device 900 may include an eighth UWB antenna 918, a ninth UWB antenna 919, a tenth UWB antenna 920, a fifteenth signal line 928, a sixteenth signal line 929, and a seventeenth signal line 930. The same reference numerals are used for components which are the same as or substantially the same as those described above, and a redundant explanation is omitted.

According to an embodiment, the eighth UWB antenna 918 and the ninth UWB antenna 919 may be disposed in the main flexible display 122 along a second axis. In an embodiment, the second axis may be referred to as an axis that is substantially perpendicular to the y-axis of FIG. 9A.

According to an embodiment, the ninth UWB antenna 919 and the tenth UWB antenna 920 may be disposed in the main flexible display 122 along a first axis. In an embodiment, the first axis may be referred to as an axis that is substantially parallel to the y-axis of FIG. 9A.

According to an embodiment, the eighth UWB antenna 918 may be electrically connected or may not be connected with the UWB IC 240 according to a state 100a, 100b of the electronic device 900. For example, a second portion 928b of the fifteenth signal line 928 may be entered into the first housing 111 or the second housing 112 along with the main flexible display 122 as the electronic device switches from the second state 100b to the first state 100a. In this case, a first portion 928a of the fifteenth signal line 928 may not be electrically connected with the second portion 928b, and the eighth UWB antenna 918 and the UWB IC 240 may not be electrically connected. In another example, the second portion 928b may be exposed to the outside of the first housing 111 or the second housing 112 as the electronic device switches from the first state 100a to the second state 100b. In this case, the first portion 928a and the second portion 928b of the fifteenth signal line 928 may be electrically connected, and the eighth UWB antenna 918 and the UWB IC 240 may be electrically connected.

According to an embodiment, the ninth UWB antenna 919 may be electrically connected or may not be connected with the UWB IC 240 according to a state 100a, 100b of the electronic device 900. For example, a second portion 929b of the sixteenth signal line 929 may be entered into the first housing 111 or the second housing 112 along with the main flexible display 122 as the electronic device switches from the second state 100b to the first state 100a. In this case, a first portion 929a of the sixteenth signal line 929 may not be electrically connected with the second portion 929b, and the ninth UWB antenna 919 and the UWB IC 240 may not be electrically connected. In another example, the second portion 929b may be exposed to the outside of the first housing 111 or the second housing 112 as the electronic device switches from the first state 100a to the second state 100b. In this case, the first portion 929a and the second portion 929b of the sixteenth signal line 929 may be electrically connected, and the ninth UWB antenna 919 and the UWB IC 240 may be electrically connected.

According to an embodiment, the tenth UWB antenna 920 may be electrically connected or may not be connected with the UWB IC 240 according to a state 100a, 100b of the electronic device 900. For example, a second portion 930b of the seventeenth signal line 930 may be entered into the first housing 111 or the second housing 112 along with the main flexible display 122 as the electronic device switches from the second state 100b to the first state 100a. In this case, a first portion 930a of the seventeenth signal line 930 may not be electrically connected with the second portion 930b, and the tenth UWB antenna 920 and the UWB IC 240 may not be electrically connected. In another example, the second portion 930b may be exposed to the outside of the first housing 111 or the second housing 112 as the electronic device switches from the first state 100a to the second state 100b. In this case, the first portion 930a and the second portion 930b of the seventeenth signal line 930 may be electrically connected, and the tenth UWB antenna 920 and the UWB IC 240 may be electrically connected.

According to an embodiment, in the first state 100a, the processor 220 may control the UWB IC 240 to transmit and/or receive an RF signal of a designated frequency band, based on at least two of the first UWB antenna 211, the second UWB antenna 212, and the third UWB antenna 213. For example, in the first state 100a, the processor 220 may perform positioning based on at least two of the first UWB antenna 211, the second UWB antenna 212, and the third UWB antenna 213.

According to an embodiment, in the second state 100b, the processor 220 may control the UWB IC 240 to transmit and/or receive an RF signal of a designated frequency band, based on at least two of the eighth UWB antenna 918, the ninth UWB antenna 919, and the tenth UWB antenna 920. For example, in the second state 100b, the processor 220 may perform positioning based on at least two of the eighth UWB antenna 918, the ninth UWB antenna 919, and the tenth UWB antenna 920.

Figure 9B:
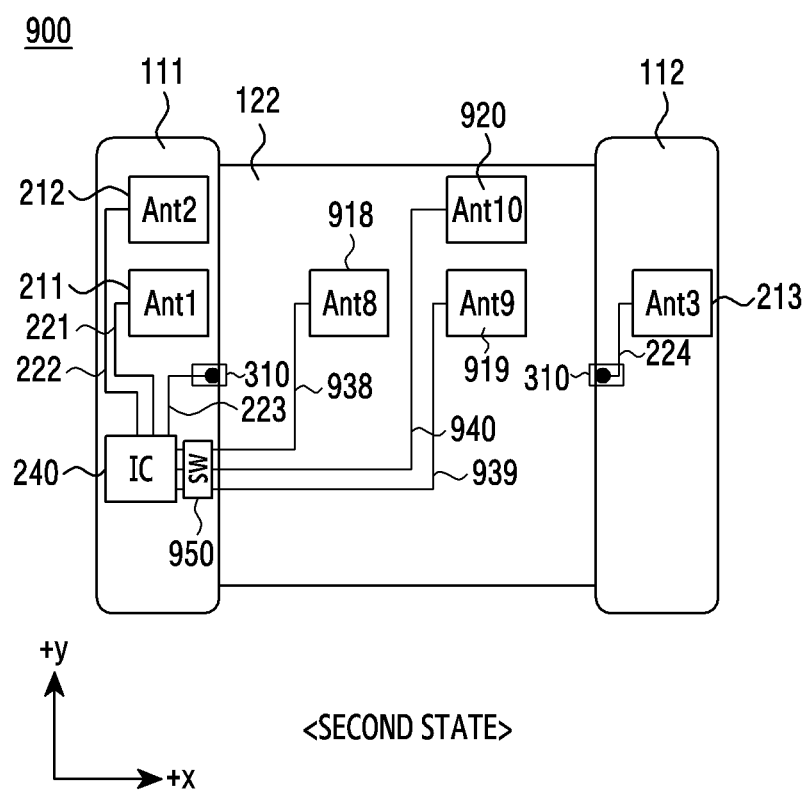
FIG. 9B is a view illustrating a UWB antenna arrangement structure in which the eighth UWB antenna, the ninth UWB antenna, the tenth UWB antenna, and a switching circuit are added in the second state according to an embodiment of the disclosure.

FIG. 9B is a view illustrating a UWB antenna arrangement structure in which the eighth UWB antenna, the ninth UWB antenna, the tenth UWB antenna, and a switching circuit are added in the second state according to an embodiment of the disclosure.

Referring to FIG. 9B, the electronic device 900 according to an embodiment may include a switching circuit 950, an eighteenth signal line 938, a nineteenth signal line 939, or a twentieth signal line 940.

According to an embodiment, the switching circuit 950 may be electrically connected to the eighth UWB antenna 918 through the eighteenth signal line 938. The switching circuit 950 may be electrically connected to the ninth UWB antenna 919 through the nineteenth signal line 939. The switching circuit 950 may be electrically connected to the tenth UWB antenna 920 through the twentieth signal line 940.

According to an embodiment, the switching circuit 950 may control an electric connection relationship between the eighth UWB antenna 918, the ninth UWB antenna 919, and/or the tenth UWB antenna 920, and the UWB IC 240 according to a state 100a, 100b of the electronic device 900.

In an embodiment, in the second state 100b, the switching circuit 950 may short-circuit a port in the switching circuit 950 that is connected with the eighteenth signal line 938, and the UWB IC 240 connected with the switching circuit 950 may be electrically connected with the eighth UWB antenna 918. In another example, in the first state, the switching circuit 950 may open the port in the switching circuit 950 that is connected with the eighteenth signal line 938, and in this case, the UWB IC 240 connected with the switching circuit 950 may not be electrically connected with the eighth UWB antenna 918.

In an embodiment, in the second state 100b, the switching circuit 950 may short-circuit a port in the switching circuit 950 that is connected with the nineteenth signal line 939, and the UWB IC 240 connected with the switching circuit 950 may be electrically connected with the ninth UWB antenna 919. In another example, in the first state 100a, the switching circuit 950 may open the port in the switching circuit 950 that is connected with the nineteenth signal line 939, and in this case, the UWB IC 240 connected with the switching circuit 950 may not be electrically connected with the ninth UWB antenna 919.

In an embodiment, in the second state 100b, the switching circuit 950 may short-circuit a port in the switching circuit 950 that is connected with the twentieth signal line, and the UWB IC 240 connected with the switching circuit 950 may be electrically connected with the tenth UWB antenna 920. In another example, in the first state 100a, the switching circuit 950 may open the port in the switching circuit 950 that is connected with the twentieth signal line 940, and in this case, the UWB IC 240 connected with the switching circuit 950 may not be electrically connected with the tenth UWB antenna 920.

Figure 10A:
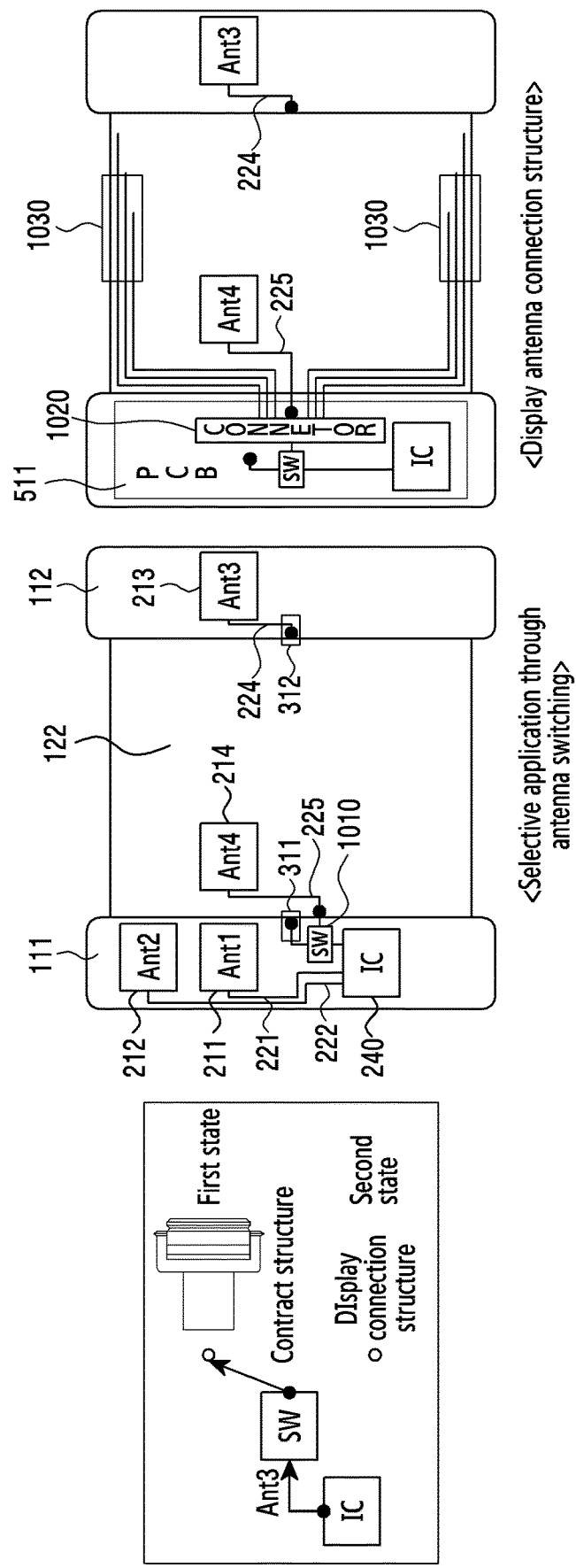
FIG. 10A is a view illustrating a connection structure of a fourth UWB antenna through a switching circuit in the second state according to an embodiment of the disclosure.

FIG. 10A is a view illustrating a connection structure of a fourth UWB antenna through a switching circuit in the second state according to an embodiment of the disclosure.

Figure 10B:
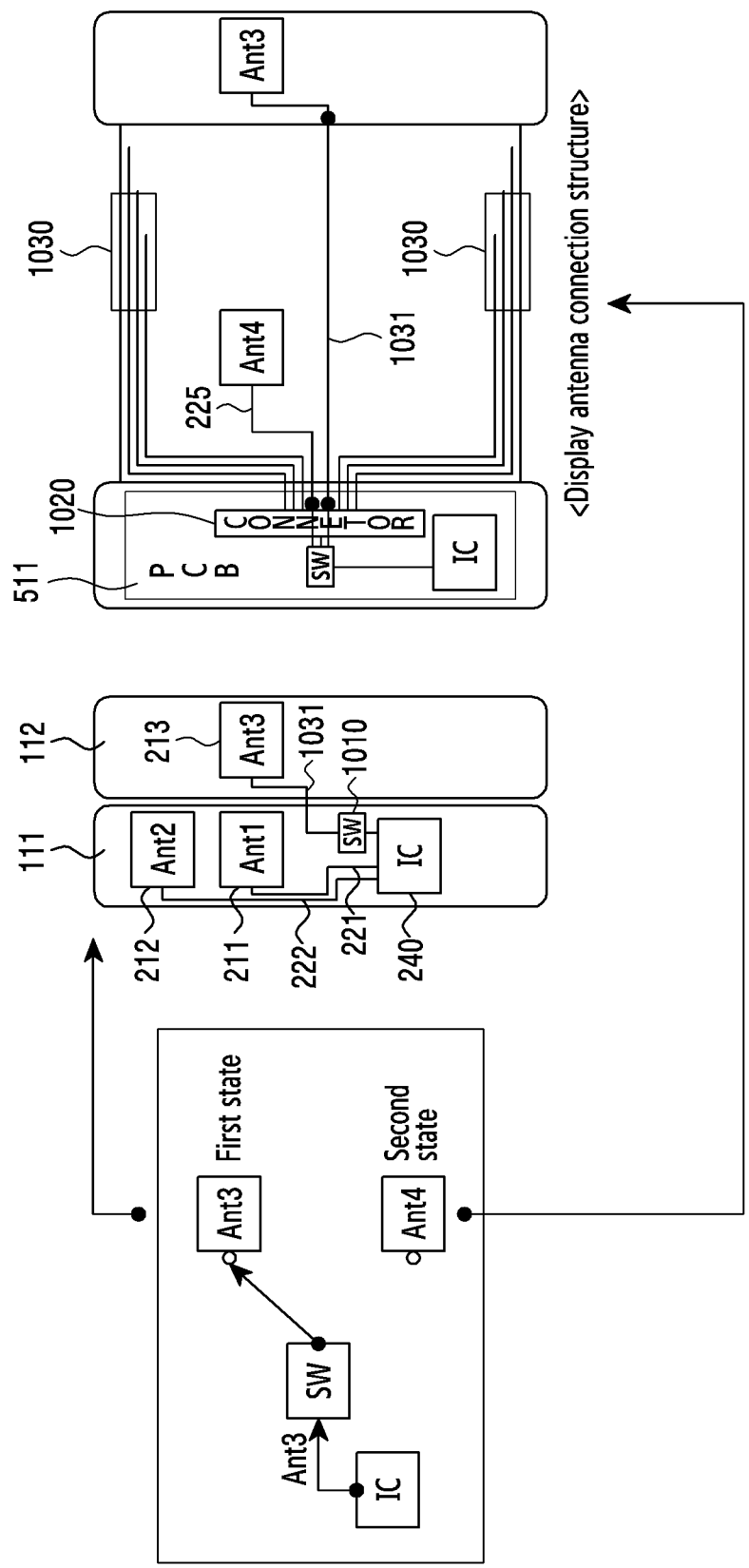
FIG. 10B is a view illustrating a connection structure of a third UWB antenna through a switching circuit in the second state according to an embodiment of the disclosure.

FIG. 10B is a view illustrating a connection structure of a third UWB antenna through the switching circuit in the second state according to an embodiment of the disclosure.

Referring to FIGS. 10A and 10B, the electronic device 100 according to an embodiment may include a switching circuit 1010 and a display connection structure 1020. In an embodiment, the switching circuit 1010 may be disposed on the first printed circuit board 511, and the display connection structure 1020 may be electrically connected with the switching circuit 1010.

According to an embodiment, the display connection structure 1020 may be electrically connected with a plurality of signal lines 1030 disposed in the main flexible display 122. For example, referring to FIGS. 10A and 10B, the fifth signal line 225 of the plurality of signal lines 1030 may be electrically connected with the fourth UWB antenna 214. In another example, referring to FIG. 10B, a display connection line 1031 of the plurality of signal lines 1030 may be electrically connected with the third UWB antenna 213.

Referring to FIG. 10A, in the first state 100a according to an embodiment, the processor 220 may control the UWB IC 240 to be electrically connected with the third UWB antenna 213 through the switching circuit 1010. For example, the processor 220 may control the switching circuit to be electrically connected to a contact member (for example, a C-clip and/or a pogo pin, the contact member of FIG. 3A) in the first state 100a. In this case, the UWB IC 240 may be electrically connected with the third UWB antenna 213 through the contact member (for example, the C clip and/or the pogo pin, the contact structure 310 of FIG. 3A).

In the second state 100b according to an embodiment, the processor 220 may control the UWB IC 240 to be electrically connected with the fourth UWB antenna 214 through the switching circuit 1010. For example, the processor 220 may cause the switching circuit 1010 to be electrically connected to the display connection structure 1020 in the second state 100b. In this case, the UWB IC 240 may be electrically connected with the fourth UWB antenna 214 which is connected with the display connection structure 1020 through the fifth signal line 225.

Referring to FIG. 10B, in the first state 100a, the processor 220 according to an embodiment may cause the switching circuit 1010 to be electrically connected with a display connection line 1031 which is connected to the display connection structure 1020. In an embodiment, in the first state 100a, the UWB IC 240 may be electrically connected with the third UWB antenna 213 through the display connection line 1031.

According to an embodiment, in the second state 100b, the processor 220 may cause the switching circuit 1010 to be electrically connected to the fifth signal line 225 which is connected to the display connection structure 1020. In this case, the UWB IC 240 may be electrically connected with the fourth UWB antenna 214 through the fifth signal line 225.

Figure 10C:
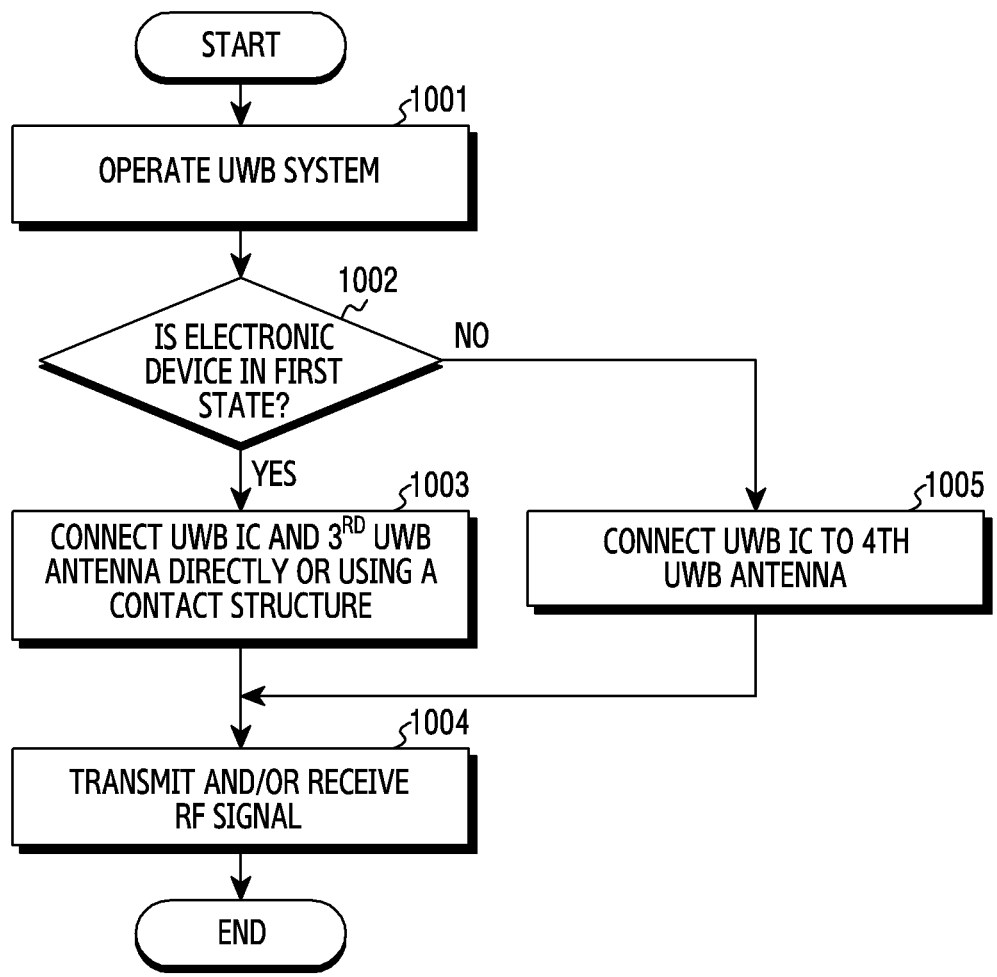
FIG. 10C is a flowchart of a UWB system operation using a UWB antenna according to an embodiment of the disclosure.

FIG. 10C is a flowchart of a UWB system operation using a UWB antenna according to an embodiment of the disclosure.

According to an embodiment, in operation 1001, the processor 220 may operate a UWB system. For example, the processor 220 may operate the UWB system by executing an application related to a UWB.

According to an embodiment, in operation 1002, the processor 220 may determine a state 100a, 100b of the electronic device. For example, the electronic device 100 may identify that the main flexible display 122 is entered into the housing 110 or is extended to the outside of the housing 110, by using at least one sensor included in the electronic device 100. The processor 220 may receive information regarding the state 100a, 100b of the electronic device 100 from the sensor, and may determine the state 100*a*, 100*b* of the electronic device 100.

According to an embodiment, when it is determined that the electronic device 100 is in the first state 100*a* in operation 1002, the processor 220 may control the switching circuit 1010 to electrically connect the third UWB antenna 213 and the UWB IC 240 in operation 1003. In an embodiment, the UWB IC 240 may be electrically connected with the third UWB antenna 213 in various methods. For example, the UWB IC 240 may be electrically connected with the third UWB antenna 213 by using a contact structure (for example, the contact structure 310 of FIGS. 3A and 3B), a C-clip, a pogo pin). In another example, the UWB IC 240 may be electrically connected with the third UWB antenna 213 through a display connection line (for example, the display connection line 1031 of FIG. 10B).

According to an embodiment, in operation 1004, the processor 220 may transmit and/or receive an RF signal of a designated frequency band, based on at least two of the first UWB antenna 211, the second UWB antenna 212, and the third UWB antenna 213. For example, in operation 1004, the processor 220 may perform positioning based on at least two of the first UWB antenna 211, the second UWB antenna 212, and the third UWB antenna 213.

According to an embodiment, when it is determined that the electronic device 100 is in the second state 100*b* in operation 1002, the processor 220 may electrically connect the switching circuit 1010 to the fifth signal line 225 which is connected to the display connection structure 1020 in operation 1005. In an embodiment, the UWB IC 240 may be electrically connected with the fourth UWB antenna 214 through the display connection structure 1020 and the fifth signal line 225.

According to an embodiment, when the UWB IC 240 is electrically connected with the fourth UWB antenna 214 in operation 1005 in the second state 100*b*, the processor 220 may transmit and/or receive an RF signal of a designated frequency band based on at least two of the first UWB antenna 211, the second UWB antenna 212, and the fourth UWB antenna 214 in operation 1004. For example, in operation 1004, the processor 220 may perform positioning based on at least two of the first UWB antenna 211, the second UWB antenna 212, and the fourth UWB antenna 214.

Figure 11:
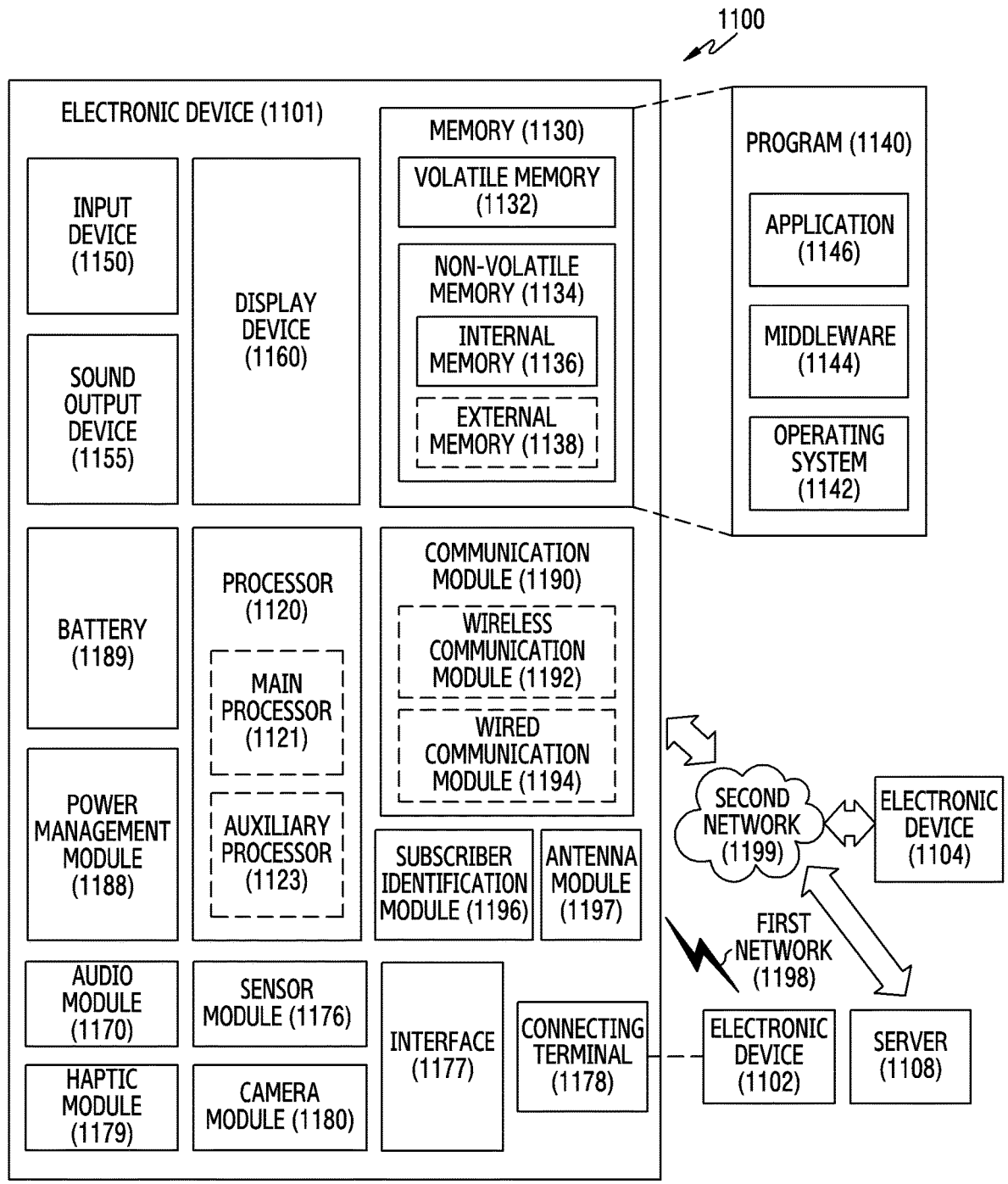
FIG. 11 is a block diagram of an electronic device in a network environment according to an embodiment of the disclosure.

FIG. 11 is a block diagram illustrating an electronic device 1101 in a network environment 1100 according to an embodiment of the disclosure.

Referring to FIG. 11, the electronic device 1101 in the network environment 1100 may communicate with an electronic device 1102 via a first network 1198 (e.g., a short-range wireless communication network), or at least one of an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input module 1150, a sound output module 1155, a display module 1160, an audio module 1170, a sensor module 1176, an interface 1177, a connecting terminal 1178, a haptic module 1179, a camera module 1180, a power management module 1188, a battery 1189, a communication module 1190, a subscriber identification module (SIM) 1196, or an antenna module 1197. In some embodiments, at least one of the components (e.g., the connecting terminal 1178) may be omitted from the electronic device 1101, or one or more other components may be added in the electronic device 1101. In some embodiments, some of the components (e.g., the sensor module 1176, the camera module 1180, or the antenna module 1197) may be implemented as a single component (e.g., the display module 1160).

The processor 1120 may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may store a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), or an auxiliary processor 1123 (e.g., a graphics processing unit (GPU), a neural processing unit (NPU), an image signal processor (ISP), a sensor hub processor, or a communication processor (CP)) that is operable independently from, or in conjunction with, the main processor 1121. For example, when the electronic device 1101 includes the main processor 1121 and the auxiliary processor 1123, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display module 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123. According to an embodiment, the auxiliary processor 1123 (e.g., the neural processing unit) may include a hardware structure specified for artificial intelligence model processing. An artificial intelligence model may be generated by machine learning. Such learning may be performed, e.g., by the electronic device 1101 where the artificial intelligence is performed or via a separate server (e.g., the server 1108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by another component (e.g., the processor 1120) of the electronic device 1101, from the outside (e.g., a user) of the electronic device 1101. The input module 1150 may include, for example, a microphone, a mouse, a keyboard, a key (e.g., a button), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. According to an embodiment, the display module 1160 may include a touch sensor adapted to detect a touch, or a pressure sensor adapted to measure the intensity of force incurred by the touch.

The audio module 1170 may convert a sound into an electrical signal and vice versa. According to an embodiment, the audio module 1170 may obtain the sound via the input module 1150, or output the sound via the sound output module 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The wireless communication module 1192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1192 may support a high-frequency band (e.g., the mmWave band) to achieve, e.g., a high data transmission rate. The wireless communication module 1192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1192 may support various requirements specified in the electronic device 1101, an external electronic device (e.g., the electronic device 1104), or a network system (e.g., the second network 1199). According to an embodiment, the wireless communication module 1192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1197 may transmit or receive a signal or power to or from the outside (e.g., the external electronic device) of the electronic device 1101. According to an embodiment, the antenna module 1197 may include an antenna including a radiating element composed of a conductive material or a conductive pattern formed in or on a substrate (e.g., a printed circuit board (PCB)). According to an embodiment, the antenna module 1197 may include a plurality of antennas (e.g., array antennas). In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

According to various embodiments, the antenna module 1197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 or 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, mobile edge computing (MEC), or client-server computing technology may be used, for example. The electronic device 1101 may provide ultra low-latency services using, e.g., distributed computing or mobile edge computing. In another embodiment, the external electronic device 1104 may include an internet-of-things (IoT) device. The server 1108 may be an intelligent server using machine learning and/or a neural network. According to an embodiment, the external electronic device 1104 or the server 1108 may be included in the second network 1199. The electronic device 1101 may be applied to intelligent services (e.g., smart home, smart city, smart car, or healthcare) based on 5G communication technology or IoT-related technology.

According to an embodiment, an electronic device 100 may include: a housing 110 including a first housing 111 and a second housing 112; a main flexible display 122; at least one contact structure 310; a UWB IC 240 disposed in the first housing 111, and a first UWB antenna 211, a second UWB antenna 212, a third UWB antenna 213, and a fourth UWB antenna 214, and, in a first state 100a where the first housing 111 and the second housing 112 come into contact with each other through the at least one contact structure 310, at least part of the main flexible display 122 may be entered into at least one of the first housing 111 and the second housing 112, and, in a second state 100b where the first housing 111 and the second housing 112 are spaced apart from each other more than a designated distance, at least part of the main flexible display 122 may be extended to be viewed from an outside of the electronic device, and, in the first state 100a, the UWB IC 240 may transmit and/or receive a signal of a designated frequency band, based on at least two of the first UWB antenna 211 and the second UWB antenna 212 which are disposed in the first housing 111, and the third UWB antenna 213 which is disposed in the second housing 112 and is electrically connected through the at least one contact structure 310, and, in the second state 100b, the UWB IC 240 may transmit and/or receive a signal of a designated frequency band, based on at least two of the first UWB antenna 211 and the second UWB antenna 212, and the fourth UWB antenna 214 which is disposed in the main flexible display.

According to an embodiment, the first UWB antenna 211 and the second UWB antenna 212 may be disposed in the first housing 111 along a first axis, and the first UWB antenna 211, the third UWB antenna 213, and the fourth UWB antenna 214 may be disposed along a second axis which is perpendicular to the first axis.

According to an embodiment, the UWB IC 240 in the first state 100a may perform positioning in a first direction which is parallel to the first axis, based on the first UWB antenna 211 and the second UWB antenna 212, and may perform positioning in a second direction which is parallel to the second axis, based on the first UWB antenna 211 and the third UWB antenna 213.

According to an embodiment, the electronic device 100 may further include a fifth UWB antenna 615 disposed in the second housing 112, and the fifth UWB antenna 615 may be disposed in a line with the third UWB antenna 213 in parallel with the first axis.

According to an embodiment, the fifth UWB antenna 615 may be operatively coupled with the UWB IC 240 as the electronic device switches from the second state 100B to the first state 100A, and the UWB IC 240 may perform positioning based on at least two of the first UWB antenna 211, the third UWB antenna 213, and the fifth UWB antenna 615.

According to an embodiment, the electronic device 100 may further include an additional UWB antenna (for example, the additional UWB antenna of FIG. 6) disposed in the main flexible display, and the additional UWB antenna may be disposed in a line with the fourth UWB antenna 214 in parallel with the first axis.

According to an embodiment, the additional UWB antenna (for example, the additional UWB antenna of FIG. 6) may be operatively coupled with the UWB IC 240 as the electronic device switches from the first state 100*a* to the second state 100*b*, and the UWB IC 240 may perform positioning based on at least two of the first UWB antenna 211, the fourth UWB antenna 214, and the additional UWB antenna.

According to an embodiment, the electronic device 100 may further include a ninth UWB antenna 919 and a tenth UWB antenna 920, and the ninth UWB antenna 919 may be disposed in a line with the eighth UWB antenna 918 along the second axis, and may be operatively coupled with the UWB IC 240 disposed in the first housing 111 in the second state 100*b*, and the tenth UWB antenna 920 may be disposed in a line with the ninth UWB antenna 919 in parallel with the first axis, and may be operatively coupled with the UWB IC 240 disposed in the first housing 111 in the second state 100B, and the UWB IC 240 may perform positioning based on at least two of the eighth UWB antenna 918, the ninth UWB antenna 919, and the tenth UWB antenna 920.

According to an embodiment, the UWB IC 240 may execute an application related to UWB communication, may identify a round trip time (RTT) and an angle of arrival (AOA) of an RF signal, based on the RF signal received from an external device by using at least two of the first UWB antenna 211, the second UWB antenna 212, the third UWB antenna 213, and the fourth UWB antenna 214; and may determine a position of the external device based on the identified RTT and AOA.

According to an embodiment, the at least one contact structure 310 may include a first structure 311 disposed on a first portion of the first housing 111, and a second structure 312 disposed on a second portion of the second housing 112 which faces the first portion of the first housing 111, and the first structure 311 may include a first coupling member 311*a*, a first contact member 311*c*, and a first contact member 311*c* configured to connect the first coupling member 311*a* and the first contact member 311*c*, and the second structure 312 may include a second coupling member 312*a* and a second contact member 312*c*.

According to an embodiment, the first structure 311 may include a first magnet 411 which is disposed adjacent to the first contact member 311*c* of the first structure 311, and the second structure 312 may include a second magnet 412 which is disposed adjacent to the second contact member 312*c* of the second structure 312 to correspond to a position of the first magnet 411.

According to an embodiment, the electronic device 100 may further include a second UWB IC 741 disposed in the second housing 112; and a sixth UWB antenna 716 and a seventh UWB antenna 717 which are disposed in the main flexible display 122.

According to an embodiment, in the first state 100*a*, the second UWB IC 741 may be operatively coupled with the first UWB antenna 211, the second UWB antenna 212, and the third UWB antenna 213, and may perform positioning based on at least two of the first UWB antenna 211, the second UWB antenna 212, and the third UWB antenna 213, and, in the second state 100*b*, the second UWB IC 741 may be operatively coupled with the third UWB antenna 213, the sixth UWB antenna 716 and the seventh UWB antenna 717, and may perform positioning based on at least two of the third UWB antenna 213, the sixth UWB antenna 716, and the seventh UWB antenna 717.

According to an embodiment, the electronic device 100 may further include a button 130 disposed on the first housing 111 or the second housing 112, and, when an input is made on the button 130, the electronic device 100 may switch from the first state 100*a* to the second state 100*b* or switches from the second state 100*b* to the first state 100*a*.

According to an embodiment, the electronic device 100 may further include a sub display 121 disposed on one surface of the first housing 111 or one surface of the second housing 112.

According to an embodiment, an electronic device 100 may include: a housing 110 including a first housing 111 and a second housing 112; a main flexible display 122; at least one contact structure 310; a UWB IC 240 disposed in the first housing 111; and a first UWB antenna 211, a second UWB antenna 212, and a third UWB antenna 213, and, in a first state 100*a* where the first housing 111 and the second housing 112 come into contact with each other through the at least one contact structure 310, the main flexible display 122 may be entered into at least one of the first housing 111 and the second housing 112, and, in a second state 100*b* where the first housing 111 and the second housing 112 are spaced apart from each other more than a designated distance, the main flexible display 122 may be extended to be viewed from an outside of the electronic device 100, and, in the first state 100*a*, the UWB IC 240 may transmit and/or receive a signal of a designated frequency band, based on the first UWB antenna 211 and the second UWB antenna 212 which are disposed in the first housing 111 along a first axis, and the third UWB antenna 213 which is disposed in the second housing 112 along a second axis which is perpendicular to the first axis, and is electrically connected through the at least one contact structure 310.

According to an embodiment, the first UWB antenna 211 and the second UWB antenna 212 may be disposed in the first housing 111 along the first axis, and the first UWB antenna 211 and the third UWB antenna 213 may be disposed along the second axis which is perpendicular to the first axis.

According to an embodiment, the UWB IC 240 in the first state 100*a* may perform positioning in a first direction which is parallel to the first axis, based on the first UWB antenna 211 and the second UWB antenna 212, and may perform positioning in a second direction which is parallel to the second axis, based on the first UWB antenna 211 and the third UWB antenna 213.

According to an embodiment, the at least one contact structure 310 may include a first structure 311 disposed on a first portion of the first housing 111, and a second structure 312 disposed on a second portion of the second housing 112 which faces the first portion of the first housing 111, and the first structure 311 may include a first coupling member 311*a*, a first contact member 311*c*, and a first connection member 311*b* configured to connect the first coupling member 311*a* and the first contact member 311*c*, and the second structure 312 may include a second coupling member 312*a* and a second contact member 312*c*.

According to an embodiment, the UWB IC 240 may execute an application related to UWB communication, may identify a round trip time (RTT) and an angle of arrival (AOA) of an RF signal, based on the RF signal received from an external device by using at least two of the first UWB antenna 211, the second UWB antenna 212, the third UWB antenna 213, and the fourth UWB antenna 214, and may determine a position of the external device based on the identified RTT and AOA.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
   a housing including a first housing and a second housing;
   a flexible display;
   at least one contact structure;
   a first processor disposed in the first housing;
   a first ultrawide band (UWB) antenna;
   a second UWB antenna;
   a third UWB antenna; and
   a fourth UWB antenna,
   wherein, in a first state in which the first housing and the second housing are in contact with each other through the at least one contact structure, at least part of the flexible display is entered into at least one of the first housing and the second housing,
   wherein, in a second state in which the first housing and the second housing are spaced apart from each other more than a designated distance, at least part of the flexible display is extended to be viewed from an outside of the electronic device, wherein, in the first state, the first processor is configured to transmit and/or receive a signal of a designated frequency band, based on at least two of the first UWB antenna and the second UWB antenna which are disposed in the first housing, and the third UWB antenna which is disposed in the second housing and is electrically connected to the first processor through the at least one contact structure, and wherein, in the second state, the first processor is configured to transmit and/or receive a signal of a designated frequency band, based on at least two of the first UWB antenna and the second UWB antenna, and the fourth UWB antenna which is disposed in the flexible display.

2. The electronic device of claim 1,
wherein the first UWB antenna and the second UWB antenna are disposed in the first housing along a first axis, and
wherein the first UWB antenna, the third UWB antenna, and the fourth UWB antenna are disposed along a second axis which is perpendicular to the first axis.

3. The electronic device of claim 2, wherein the first processor in the first state is further configured to:
perform positioning in a first direction which is parallel to the first axis, based on the first UWB antenna and the second UWB antenna; and
perform positioning in a second direction which is parallel to the second axis, based on the first UWB antenna and the third UWB antenna.

4. The electronic device of claim 2, further comprising:
a fifth UWB antenna disposed in the second housing,
wherein the fifth UWB antenna is disposed in a line with the third UWB antenna in parallel with the first axis.

5. The electronic device of claim 4,
wherein the fifth UWB antenna is operatively coupled with the first processor as the electronic device switches from the second state to the first state, and
wherein the first processor is further configured to perform positioning based on at least two of the first UWB antenna, the third UWB antenna, and the fifth UWB antenna.

6. The electronic device of claim 2, further comprising:
a fifth UWB antenna disposed in the flexible display,
wherein the fifth UWB antenna is disposed in a line with the fourth UWB antenna in parallel with the first axis.

7. The electronic device of claim 6,
wherein the fifth UWB antenna is operatively coupled with the first processor as the electronic device switches from the first state to the second state, and
wherein the first processor is further configured to perform positioning based on at least two of the first UWB antenna, the fourth UWB antenna, and the fifth UWB antenna.

8. The electronic device of claim 2, further comprising:
a fifth UWB antenna and a sixth UWB antenna disposed in the flexible display,
wherein the fifth UWB antenna is disposed in a line with the fourth UWB antenna along the second axis, and is operatively coupled with the first processor disposed in the first housing in the second state,
wherein the sixth UWB antenna is disposed in a line with the fifth UWB antenna in parallel with the first axis, and is operatively coupled with the first processor disposed in the first housing in the second state, and wherein the first processor is further configured to perform positioning based on at least two of the fourth UWB antenna, the fifth UWB antenna, and the sixth UWB antenna.

9. The electronic device of claim 1, wherein the first processor is further configured to:
execute an application related to UWB communication;
identify a round trip time (RTT) and an angle of arrival (AOA) of an RF signal, based on the RF signal received from an external device by using at least two of the first UWB antenna, the second UWB antenna, the third UWB antenna, and the fourth UWB antenna; and
determine a position of the external device based on the identified RTT and AOA.

10. The electronic device of claim 1,
wherein the at least one contact structure includes a first structure disposed on a first portion of the first housing, and a second structure disposed on a second portion of the second housing which faces the first portion of the first housing,
wherein the first structure includes a first coupling member, a first contact member, and a first connection member configured to connect the first coupling member and the first contact member, and
wherein the second structure includes a second coupling member and a second contact member.

11. The electronic device of claim 10,
wherein the first structure comprises a first magnet which is disposed adjacent to the first contact member of the first structure, and
wherein the second structure comprises a second magnet which is disposed adjacent to the second contact member of the second structure to correspond to a position of the first magnet.

12. The electronic device of claim 1, further comprising:
a second processor disposed in the second housing; and
a fifth UWB antenna and a sixth UWB antenna which are disposed in the flexible display.

13. The electronic device of claim 12,
wherein, in the first state, the second processor is operatively coupled with the first UWB antenna, the second UWB antenna, and the third UWB antenna, and is configured to perform positioning based on at least two of the first UWB antenna, the second UWB antenna, and the third UWB antenna, and
wherein, in the second state, the second processor is operatively coupled with the third UWB antenna, the fifth UWB antenna and the sixth UWB antenna, and is configured to perform positioning based on at least two of the third UWB antenna, the fifth UWB antenna, and the sixth UWB antenna.

14. The electronic device of claim 1, further comprising:
a button disposed on the first housing or the second housing,
wherein, in response to a user input on the button, the electronic device switches from the first state to the second state or switches from the second state to the first state.

15. The electronic device of claim 1, further comprising a sub display disposed on one surface of the first housing or one surface of the second housing.

16. An electronic device comprising:
a housing including a first housing and a second housing;
a flexible display;
at least one contact structure;
at least one processor disposed in the first housing;
a first ultrawide band (UWB) antenna;

a second UWB antenna; and a third UWB antenna, wherein, in a first state in which the first housing and the second housing are in contact with each other through the at least one contact structure, the flexible display is entered into at least one of the first housing and the second housing, wherein, in a second state in which the first housing and the second housing are spaced apart from each other more than a designated distance, the flexible display is extended to be viewed from an outside of the electronic device, and wherein, in the first state, the at least one processor is configured to transmit and/or receive a signal of a designated frequency band, based on at least two of the first UWB antenna and the second UWB antenna which are disposed in the first housing along a first axis, and the third UWB antenna which is disposed in the second housing along a second axis which is perpendicular to the first axis, and is electrically connected with the at least one processor through the at least one contact structure.

17. The electronic device of claim 16, wherein the first UWB antenna and the second UWB antenna are disposed in the first housing along the first axis, and wherein the first UWB antenna and the third UWB antenna are disposed along the second axis which is perpendicular to the first axis.

18. The electronic device of claim 16, wherein the at least one processor in the first state is further configured to:

perform positioning in a first direction which is parallel to the first axis, based on the first UWB antenna and the second UWB antenna; and perform positioning in a second direction which is parallel to the second axis, based on the first UWB antenna and the third UWB antenna.

19. The electronic device of claim 16, wherein the at least one contact structure comprises a first structure disposed on a first portion of the first housing, and a second structure disposed on a second portion of the second housing which faces the first portion of the first housing, wherein the first structure comprises a first coupling member, a first contact member, and a first connection member configured to connect the first coupling member and the first contact member, and wherein the second structure comprises a second coupling member and a second contact member.

20. The electronic device of claim 16, wherein the at least one processor is further configured to:

execute an application related to UWB communication;

identify a round trip time (RTT) and an angle of arrival (AOA) of an RF signal, based on the RF signal received from an external device by using at least two of the first UWB antenna, the second UWB antenna, and the third UWB antenna; and determine a position of the external device based on the identified RTT and AOA.

* * * * *